(12) United States Patent
Volino

(10) Patent No.: US 6,400,845 B1
(45) Date of Patent: Jun. 4, 2002

(54) SYSTEM AND METHOD FOR DATA EXTRACTION FROM DIGITAL IMAGES

(75) Inventor: Gary Volino, Atlanta, GA (US)

(73) Assignee: Computer Services, Inc., Atlanta, GA (US)

( * ) Notice: Subject to any disclaimer, the term of this patent is extended or adjusted under 35 U.S.C. 154(b) by 0 days.

(21) Appl. No.: 09/298,384

(22) Filed: Apr. 23, 1999

(51) Int. Cl.7 .................................................. G06K 9/34
(52) U.S. Cl. ........................ 382/176; 358/462; 382/305; 707/1
(58) Field of Search ................................ 382/100, 112, 382/171–173, 176, 180, 181, 190, 202–203, 209, 217, 218, 229, 282–283, 305, 317, 321; 358/1.15, 462, 435, 436; 380/51; 705/75; 707/1, 507, 513.2, 10, 500, 531, 3–7

(56) References Cited

U.S. PATENT DOCUMENTS

| | | | | |
|---|---|---|---|---|
| 4,949,392 A | | 8/1990 | Barski et al. ................ 382/283 |
| 5,140,650 A | | 8/1992 | Casey et al. ................ 382/283 |
| 5,293,429 A | | 3/1994 | Pizano et al. ............... 382/202 |
| 5,416,849 A | | 5/1995 | Huang ......................... 382/173 |
| 5,430,808 A | | 7/1995 | Baird et al. ................. 382/176 |
| 5,754,673 A | | 5/1998 | Brooks et al. .............. 382/112 |
| 5,815,595 A | | 9/1998 | Gugler ........................ 382/173 |
| 5,822,454 A | | 10/1998 | Rangarajan ................. 382/180 |
| 5,841,905 A | | 11/1998 | Lee ............................. 382/203 |
| 5,842,195 A | | 11/1998 | Peters et al. .................... 707/1 |
| 5,950,214 A | * | 9/1999 | Rivette al. ................... 707/512 |
| 5,963,965 A | * | 10/1999 | Vogel ........................... 707/501 |
| 5,963,966 A | * | 10/1999 | Mitchell et al. ............ 707/513 |
| 6,052,693 A | * | 4/2000 | Smith et al. ................ 707/104 |
| 6,085,201 A | * | 7/2000 | Tso .............................. 707/505 |
| 6,253,188 B1 | * | 6/2001 | Witek et al. ................... 705/14 |

* cited by examiner

Primary Examiner—Jayanti K. Patel
(74) Attorney, Agent, or Firm—Morris, Manning & Martin, LLP

(57) ABSTRACT

A system and method of the extraction of textual data from a digital image using a data pattern comprised of visible and invisible characters to locate the data to be extracted and upon find such data populating the fields of an associated data base with the extracted visible data. The digital image to be processed is first compared against master document images contained in a database. Upon determining the proper master document image, a template having pre-defined data zone is applied to the image to create zone images. The zone images are optically read and converted into a character file which is then parsed with the pattern to locate the text to be extracted. Upon finding data matching the pattern, that data is extracted and the visible portions used to populate data fields in a database record associated with the digital image.

In an alternate embodiment, if the extracted data cannot be successfully matched, a validation file of the unmatched data is created for review by an operator. In a further embodiment, if the scanned digital image cannot be matched with an existing master document image, a new master document image can be created from the unmatched digital image. In another alternate embodiment, alternate patterns can be used to search the data files allowing for variation in format of the data being extracted.

13 Claims, 24 Drawing Sheets

| HEALTHCARE CORPORATION | | | INVOICE 507 | |
|---|---|---|---|---|
| 522  502  RENAL DIVISION | | | DATE 11/11/97 | NUMBER J33518 |
| SHIP TO ACCOUNT No. 112-6990-A611050 - 3103 506 | | | | |
| SHIP TO: JOHN DOE  501  123 MAIN ST  NEW YORK NY 12345 | | 520  505 | PAYMENT TERMS:  2.0% 10 DAYS  NET 31 DAYS | |
| SOLD TO: ABC MEDICAL SUPPLY INC  503  321 WEST PARK AVE  NEW YORK NY 60048 | | 520  520  504 | REMIT TO:  RENAL DIVISION  P.O. BOX 9630  CHICAGO, IL 60673 | |

SOLD TO ACCOUNT No. 112-4320-A600480 - 3103

519  518  511  516

IF YOU HAVE ANY QUESTIONS REGARDING, THIS INVOICE PLEASE SEND A COPY OF THE INVOICE TO OUR CUSTOMS OPERATIONS DEPARTMENT. INCLUDE AN EXPLANATION ON YOUR QUESTION, PLUS ANY SUPPORTING DOCUMENTATION.

| CUSTOMER PURCHASE ORDER NUMBER | SHIPPING ORDER NO | DATE SHIPPED | | DATE ORDER RECEIVED |
|---|---|---|---|---|
| 523 | SEE BELOW | SEE BELOW | 0551112710 1 | 11/03/97 |

| QTY | UNITS PER CASE | CATALOG NUMBER | PRODUCT DESCRIPTION | SIZE | UNIT PRICE | AMOUNT |
|---|---|---|---|---|---|---|
| 508 | 509 | 510 | ORD NO MG565849A DATE SHP 11/11/97 | 512 | 513 | 514 |
| 8 | 4 | 5B9902 | DIANL LOW CA2.5% DX 3L/3L TAX $2.62 | | 26,200 | 209,60 |
| 1 | 4 | 5B9903 | DIANL LOW CA4.25% DX 3L/3L TAX $0.33 | | 26,400 | 26,40 |
| 1 | 15 | 5C4464 | 12 FOOT EXTENSION SET TAX $0.38 | | 30,300 | 30,30 |
| 50 | 2 | 5B5202 | DIANL LOW CA 2.5% DX 5L/5L TAX $11.44 | | 18,300 | 915,00 |
| 17 | 2 | 5B5203 | DIANL LOW CA 4.25% DX 5L/5L TAX $3.91 | | 18,400 | 312,80 |
| 1 | 60 | 5C4366P | CAPD DISP DISCONNECT Y-SET, BULK PACK TAX $1.13 | | 90,000 | 90,00 |
| 1 | 30 | 5C4469 | HOMECHOICE AUTOMATED PD SET W/CASSETTE - 4PRO TAX $3.30 | | 264,000 | 264,00 |
| 2 | 15 | 5C4480 | 12 FOOT EXTENSION SET, EASY-LOCK CONNECT TAX $1.03 | | 41,250 | 82,50 |
| | | | ORD NO SK565849A DATE SHP 11/07/97 | | | |
| 100 | EACH | 5K7253 | **1CC INSLN SYR 25GX1" NDL TAX $0.38 | | ,306 | 30,60 |
| 3 | EACH | 5K7619 | TRANSPORE TAPE, 1" X 10 YDS TAX $0.25 | | 1,274 | 3,82 |
| 3 | EACH | 5K7624 | DURAPORE TAPE 1" X 10 YDS TAX $0.18 | | ,943 | 2,83 |
| | | | CONTINUED ON FOLLOWING PAGE | 521 | | |

SEND CUSTOMER OPERATIONS INQUIRIES TO: (NO CHECKS)  PAGE 1

RENAL DIVISION
1-888-5432 HELP
1620 WAUKEGAN ROAD

517
DUPLICATE INVOICE

TOTAL 523  516

HEALTHCARE CORPORATION                    INVOICE

SHIP TO ACCOUNT No. —502          DATE        NUMBER
                                   506         507

SHIP TO: —501                     PAYMENT TERMS:
                                        505

SOLD TO: —503

SOLD TO ACCOUNT NO.—518
      519
CUSTOMER PURCHASE ORDER NUMBER

| QUANTITY | CATALOG NUMBER | PRODUCT DESCRIPTION | UNIT PRICE | AMOUNT |
|----------|----------------|---------------------|------------|--------|
| 508      | 509            | 510                 | 513        | 514    |

515 — TOTAL

Vetex Form Preprocess Settings

- Image Orientation
- Fix White Text
- Image Enhancements
- Noise Removal
- Character Enhancements
- Image Extraction Deskew Form
Registration
Line Management ☑ Horizontal Register — 611 / 611b
Resultant Left Margin  150 — 612 / 612b
☑ Horizontal Central Focus — 613 / 613b
☑ Horizontal Add Only — 614 / 614b
Horizontal Line Register  0 — 615 / 615b
Horizontal Line Register Width  0 — 616 / 616b
Horizontal Line Register Gap  0 — 617 / 617b
Horizontal Line Register Skip Lines  0 — 618 / 618b
☐ Horizontal Ignore Binder Holes — 619

☑ Vertical Register
Resultant Upper Margin  150
☑ Vertical Central Focus
☑ Vertical Add Only
Vertical Line Register  0
Vertical Line Register Width  0
Vertical Line Register Gap  0
Vertical Line Register Skip Lines  0

Return

Vetex Form Enhancement Settings

- Deskew Form
- Image Orientation
- Fix White Text
- Registration
- Image Enhancements
- Noise Removal
- Line Management
- Image Extraction
- Character Enhancements 661 — Horizontal Despeck — 0
662 — Vertical Despeck — 0
663 — Isolated Despeck — 0
664 — Isolated Despeck Width — 0

665 — ☐ Dot Shading Removal
666 — Minimum Area Despeck Height — 0
667 — Minimum Area Despeck Width — 0
668 — Maximum Speck Size — 0
669 — Horizontal Size Adjustment — 0
671 — Vertical Size Adjustment — 0
672 — Character Protection | Protect Disabled ▼
673 — ☐ Despeck Report Location Return

ADDR. ZONE PATTERN 1

| 1301 → TAB | TAB | FIRST NAME 1-20 ALPHA CHARACTERS | SPACE | LAST NAME 1-20 ALPHA CHARACTERS | LF | CR |
| 1305 → TAB | TAB | STREET NO 1-10 ALPHA/NUM CHAR | SPACE | STREET NAME 1-20 ALPHA/NUM CHAR | LF | CR |
| 1307 → TAB | TAB | CITY 1-20 ALPHA/NUM CHAR | SPACE | STATE CODE 2A/NCH | SPACE | POSTAL CODE | LF | CR |

FIG. 13B

ADDR. ZONE PATTERN 2

| 1301A → TAB | TAB | FIRST NAME | SPACE | M.I. | SPACE | LAST NAME | LF | CR |

REMAINDER OF PATTERN

SYSTEM AND METHOD FOR DATA EXTRACTION FROM DIGITAL IMAGES

CROSS-REFERENCE TO RELATED INVENTIONS

Not Applicable

STATEMENT REGARDING FEDERALLY FUNDED RESEARCH

Not Applicable

REFERENCE TO A MICROFICHE INDEX

Not Applicable

COPYRIGHT NOTICE

Copyright 1999 Computer Services, Inc. A portion of the disclosure of this patent document contains materials which are subject to copyright protection. The owner has no objection to the facsimile reproduction by anyone of the patent document or patent disclosure, as it appears in the Patent and Trademark Office patent file or records, but otherwise reserves all rights, copyright rights whatsoever.

BACKGROUND OF THE INVENTION

1. Field Of The Invention

This invention generally relates to systems and methods for the extraction of data from digital images and more particularly, to a system and method for the extraction of textual data from digital images.

2. Background Information

Systems are known which import data from scanned paper documents. Typically, these systems identify by physical location a data field in a scanned image of a blank document. When the system scans documents conforming to that blank document type, the data field location information is used to identify the area in the scanned document where the corresponding data appears and that data is then converted from bit mapped image data to text data for storage in a database.

In U.S. Pat. No. 4,949,392 entitled "Document Recognition and Automatic Indexing for Optical Character Recognition," issued Aug. 14, 1990, preprinted lines appearing on the form are used to locate text data and then the pre printed lines are filtered out of the image prior to optical character recognition processing. In U.S. Pat. No. 5,140,650 entitled "Computer Implemented Method for Automatic Extraction of Data from Printed Forms," issued Aug. 18, 1992, lines in the image of a scanned document or form are used to define a data mask based on pixel data which is then used to locate the text to be extracted. In U.S. Pat. No. 5,293,429 entitled "System and Method for Automatically Classifying Heterogeneous Business Forms," issued Mar. 8, 1994, the system uses a definition of lines within a data form to identify fields where character image data exists. Blank forms are used to create a form dictionary which is used to identify areas in which character data may be extracted. In U.S. Pat. No. 5,416,849 entitled "Data Processing System and Method for Field Extraction of Scanned Images of Document Forms," issued May 16, 1995, the system of document image processing uses Cartesian coordinates to define data field location. In U.S. Pat. No. 5,815,595 entitled "Method and Apparatus for Identifying Text Fields and Checkboxes in Digitized Images," issued Sep. 29, 1998, a system locates data fields using graphic data such as lines. In U.S. Pat. No. 5,822,454 entitled "System and Method for Automatic Page Registration and Automatic Zone Detection during Forms Processing," issued Oct. 13, 1998, the system uses positional coordinate data to identify areas within a scanned document for data extraction. In U.S. Pat. No. 5,841,905 entitled "Business Form Image Identification Using Projected Profiles of Graphical Lines and Text String Lines," issued Nov. 24, 1998, the system uses cross-correlation of graphical image data to identify a form and the areas within the form for data extraction.

Each of these patents discloses a system which uses graphical data to identify forms or regions within a form for data extraction. By relying on graphical data to identify areas for data extraction, should additional or the wrong type of textual data be present in such areas that data will also be extracted and stored. It would be advantageous to be able to determine if the extracted data matches the type of data that is expected to be on the form. Also if the data were of the correct type but mispositioned somewhat with respect to its expected position on the document, it would be advantageous to be able to locate and extract such the mispositioned data. Further where data is on multiple pages, such as a two page phone bill, with the systems mentioned above, each page of the phone bill that looks different would have to be defined as a new template. It would be advantageous to have a system that can process data from multiple page forms without requiring additional preprocessing effort.

SUMMARY OF THE INVENTION

The present invention is a system and method for the extraction of textual data from digital images using a pre-defined pattern of visible and invisible characters contained in the textual data. The system comprises an image mapper, a template mapper, a zone optical character reader (OCR), a zone pattern comparator and data extractor, an extracted data parser and datastore. The datastore comprises a master document image database comprised of at least one table containing at least one master document image, a template database and an extracted data database. The template database comprises at least one table comprising at least one template associated with a master document image. The template has at least one zone and associated with each zone is a unique pattern comprised of one or more data segments. Each data segment comprises a predefined sequence of visible and invisible characters, with selected ones of the data segments being associated with an extracted data field in an extracted database record. The extracted data database comprises at least one table of extracted database records and each record comprises at least one data field for storing textual information extracted from the digital image.

The image comparator receives from the master document image database in the datastore a master document image for comparison with a digital image. The image comparator provides an output indicative of the success of the comparison. The template mapper, on receiving the image comparator output indicating a successful comparison, retrieves from the template database in the datastore the template associated with the successfully compared master document image and applies this template to the digital image. The template mapper provides as an output an image of each zone associate with the applied template. The zone optical character reader (OCR) receives the zone images and creates as an output a zone data file of the characters in each zone image. The zone pattern comparator receives from the template database the pattern associated with the zone and compares the pattern to the zone data file. In the event that the pattern is found, the data matching the pattern digital is extracted. The extracted data parser receives the extracted data and parses it based on the pattern and populates the data field of the database record associated with the digital image which is stored in the extracted data database.

The method for the extraction of textual data comprises:
a) selecting from a database a master document image having associated therewith a template, zone, and associated with each zone a pattern comprised of one or more data segments containing a data sequence of one or more characters;
b) creating an unpopulated database table having one or more data records, each data record having one or more data fields for containing visible character data extracted from the digital image and associating the database table with the master document image and the database record with the digital image, and, for at least one of the data segments containing visible data associating it with a database field;
c) comparing the digital image to the master document image and upon a successful match occurring:
applying the template and zone therein to the digital image,
performing optical character recognition on the character images within the zone,
creating a zone data file containing the characters optically read from the zone;
comparing the zone data file with the pattern associated with the zone;
extracting the data in the zone data file that matches the pattern, and, for each data segment associated with a data field, populating the data field with the visible data extracted from the zone data file corresponding to that data segment.

In an alternate embodiment, if the extracted data cannot be successfully matched, a validation file of the unmatched data is created for review by an operator. In a further embodiment, if the scanned digital image cannot be matched with an existing master document image, a new master document image can be created from the unmatched digital image. In another alternate embodiment, alternate patterns can be used to search the data files allowing for variation in format of the data being extracted.

There has thus been outlined, rather broadly, the more important features of the invention in order that the detailed description thereof that follows may be better understood, and in order that the present contribution to the art may be better appreciated. In the several figures where there are the same or similar elements, those elements will be designated with similar reference numerals. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

For a more complete understanding of the present invention and the advantages thereof, reference should be made to the following Detailed Description taken in connection with the accompanying drawings in which:

FIG. 5A is an example of an invoice which would be processed in the system using the method of the invention and FIG. 5B is an example of a master document image created from the invoice shown in FIG. 5A.

FIGS. 6A–6I present menus used for defining image enhancement properties and functions to be used on the digital image being processed during creation of a master document image.

FIGS. 13A and 13B illustrate two alternate address patterns used in the system and method of the invention.

DETAILED DESCRIPTION OF THE INVENTION

System Overview

Figure 1:
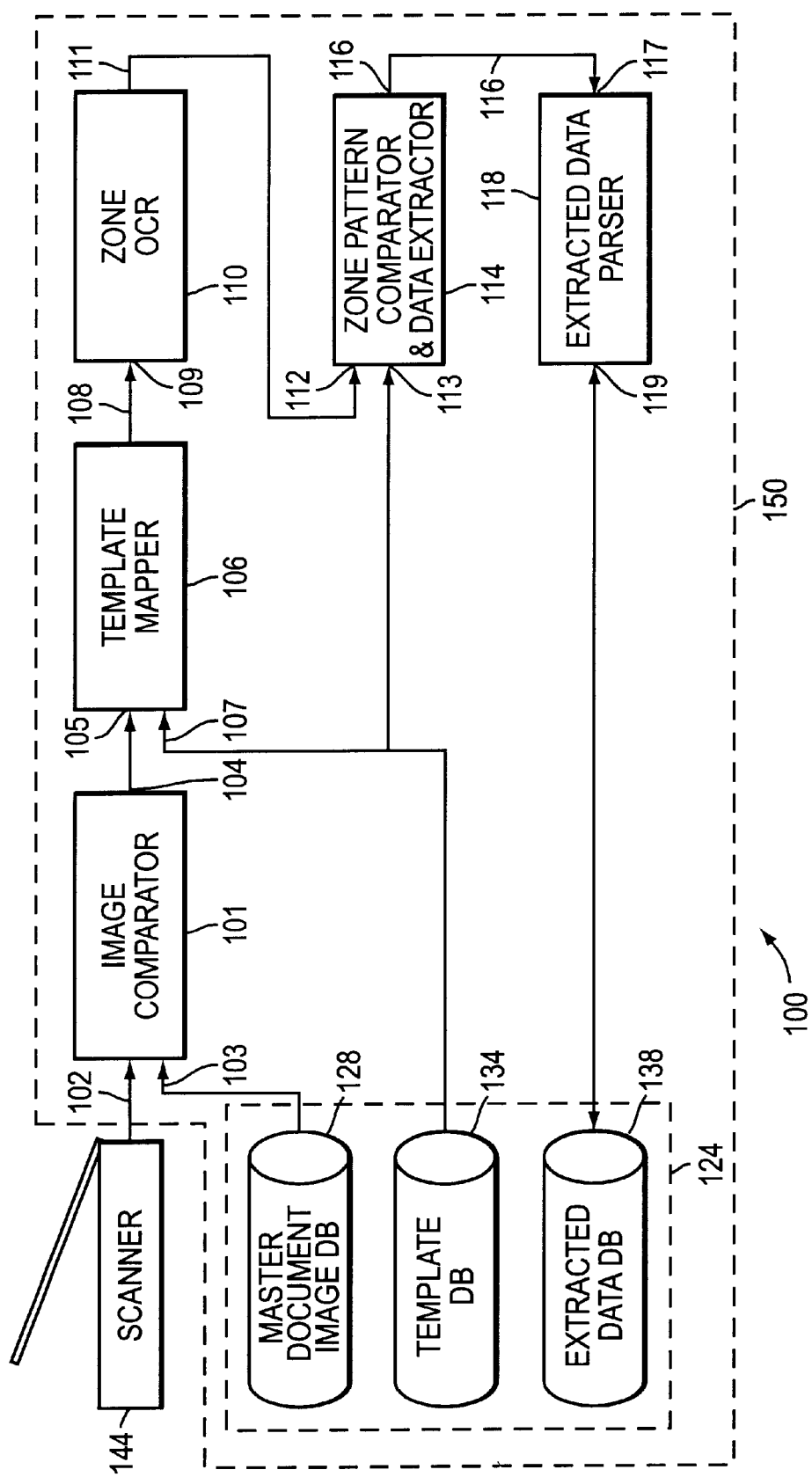
FIG. 1 is a schematic diagram of the data extraction system of the present invention.

FIG. 1 illustrates the, data extraction system 100 used for extracting textual data from digital images. The system 100 comprises image comparator 101, template mapper 106, zone optical character reader (OCR) 110, zone pattern comparator and data extractor 114, extracted data parser 118 and datastore 124.

Comprising datastore 124 is master document image database 128, template database 134, and extracted data database 138. A digital scanner 144 can also be provided. Master document image database 128 comprises at least one table containing at least one document image. As master document images are created, the system store them in this database for reference and use by the system 100. Template database 134 comprises at least one database table having at least one template associated with a master document image. Each template has at least one zone and associated with the zone is a unique pattern comprised of one or more data segments. Each data segment comprises a predefined sequence of visible and invisible characters and selected ones of the pattern segments are associated with a data field in the extracted database record. Extracted data database 138 comprises at least one table of extracted database records. Each record comprises one or more data fields which are used for the storing of textural information that is extracted from the digital image. Preferably, the tables in the databases 128, 134, 138 are part of a relational database such as Microsoft ACCESS.

Image comparator 101 receives at input 102 a digital image. This digital image can be produced and output from scanner 144 or it can be received via a diskette or from a remotely located scanner or image database via a network connection. Image comparator 101 is also in communication with the data store 124 and, in particular, with master document image database 128, from which it requests and receives a master document image at input 103. Image comparator 101 compares the master document image to the digital image and provides an output 104 indicative of the success of the comparison. If the comparison is unsuccessful, and if more master document images are available, a new master document image is selected for comparison. Template mapper 106 is in communication with datastore 124 and, in particular, with template database 134, and output 104 of image comparator 101. On receiving the image comparator output indicating a successful comparison, template mapper 106 retrieves the template from the template database associated with the successfully compared master document image. Template mapper 106 then applies the template received at input 107 to the digital image also sent from image comparator 101 and received at input 105. The template contains one or more zones which are applied to the digital image. At output 108 of template mapper 106, an image of each zone associated with the applied template is provided as input 109 to zone optical character reader 110. Zone optical character reader 110 in communication with the template mapper creates a zone data file from the character images in each zone that it receives and provides a corresponding zone data file as an output 111 which serves as an input 112 to the zone pattern comparator and data extractor 114. This data file contains both visible and invisible characters. Zone pattern comparator 114 is in communication with datastore 124 and receives at input 113 from template database 134 the pattern associated with the zone. Each zone has one unique pattern of characters associated with it. The characters can be only alphabetic characters (alpha characters), numeric characters, invisible characters such as SPACE, LINE FEED and CARRIAGE RETURN, or any combination of these character types. This pattern is then compared against the data contained in the zone data file. In the event that the pattern is found in the zone data file, the data matching the pattern is extracted and is provided as an output 116 which is then received as an input 117 to extracted data parser 118. Upon receiving the extracted pattern information, extracted data parser 118 parses the data in the extracted data file and populates the data field of the database record received at port 119 associated with the pattern that is contained to extracted data database 138.

The items indicated within a dashed box 150 can all be performed in an appropriately programmed computer system. This general purpose computer can be programmed to be image comparator 101, template mapper 106, zone OCR 110, zone pattern comparator 114, extracted data parser 118, and provide datastore 124 including the databases 128, 134 and 138 and the associated relational database program. Preferably, the system operates in a windows-type environment such as Microsoft NT or Microsoft Windows 95 or Windows 98.

Figure 2:
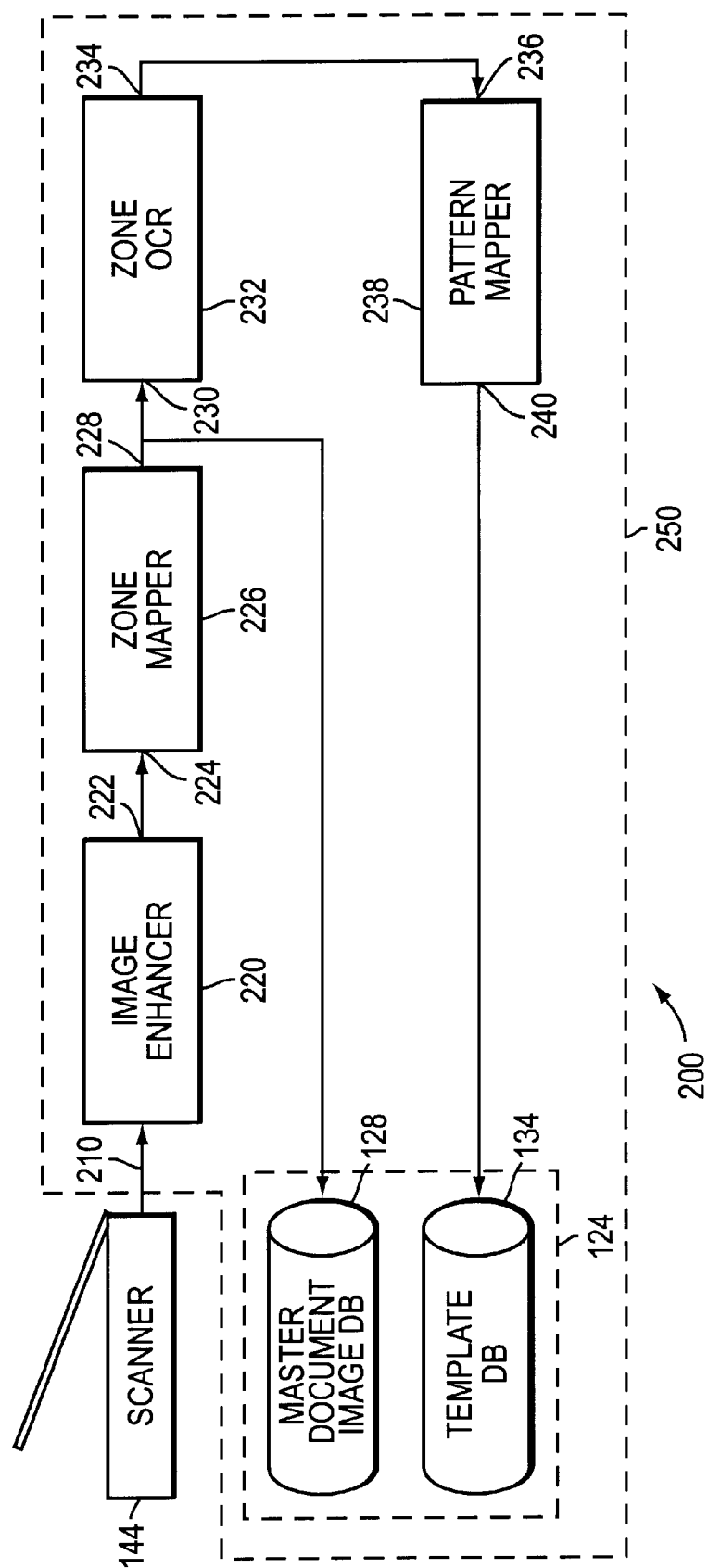
FIG. 2 is a schematic diagram of the master document image production system.

System 100 can be further enhanced to provide means for creating a master document image. The system for creating master document image 200 is illustrated in FIG. 2. Master document image database 128 and template database 134 of datastore 124 are used in system 200. Also, scanner 144 provides the digital image from which the master document image and associated template zones and patterns are created. The master document image production system 200 comprises image enhancer 220, zone mapper 226, zone OCR 232 and a pattern mapper 238. At its input 210, image enhancer 220 receives the raw digital image, in this case, from scanner 144. At image enhancer 220, the operator selects and the system performs one or more of the following operations on the raw image: deskewing, registration, align management, fixed white text, noise removal, character enhancement, image orientation, image enhancement, and image extraction. Preferably, deskewing and registration are done on every scanned imaged. These operations are explained herein in the following section. After the various operations have been selected, each is performed on the digital image producing at output 222 an enhanced digital image as the output of image enhancer 220. Zone mapper 226 in communication with the image enhancer receives the enhanced image at input 224. Zone mapper 226 comprises means for selecting one or more regions of the enhanced image and defining a selected region as a zone. Also, zone mapper 226 is provided with means for selectably removing or erasing images and data contained within a selected zone and means for associating each zone defined in the enhanced image with a template. This enhanced image is provided at output 228. System 200 stores the enhanced image having unnecessary data and graphic images removed form the master document image in master document image database 128. Preferably, the selecting, erasing and associating means are provided in a general purpose computer programmed to provide this functionality.

Each zone that has been selected in zone mapper 226 is then provided as an input 230 to zone OCR 232. As is known in the art, zone OCR 232 converts the character images contained in the zones into an ASCII data file comprised of visible and invisible characters and provides this data file at output 234. For example the ASCII codes (in hexadecimal) 09, 20, 0A, and 0B for tab, space, line feed and carriage return, respectively, are examples of invisible charters found in a scanned image. Output 234 of zone OCR 232 is provided as an input 236 to pattern mapper 238. Pattern mapper 238 in communication with both zone OCR 232 and data store 124 defines the pattern which will be then use for extracting data from the digital images which match the master document image. In pattern mapper 238, means are provided for selecting from the data file a sequence of characters to be used to define the pattern. Normally, this is accomplished by providing a window on a computer containing the sequence of data characters. Also, provided are means for creating a data template having one or more non-overlapping data segments. Each of these data segments contain one or more characters that are contained in the pattern to be created. Means are also provided for selectably associating with each data segment one or more of the following characteristics: capture data indicator, data type, data format, element length, table name, field name, field type, field length, and validation indicator. Lastly, means are provided for associating the pattern and its associated characteristics with the zone. As mentioned previously, each zone and pattern exist in a one-to-one relationship. However, a zone can encompass more characters than are found in the pattern associated with that zone. Pattern mapper 238 then provides the pattern at output 240 and stores the template and associated zones, patterns and characteristics in datastore 124 within the template database 134.

Figure 3:
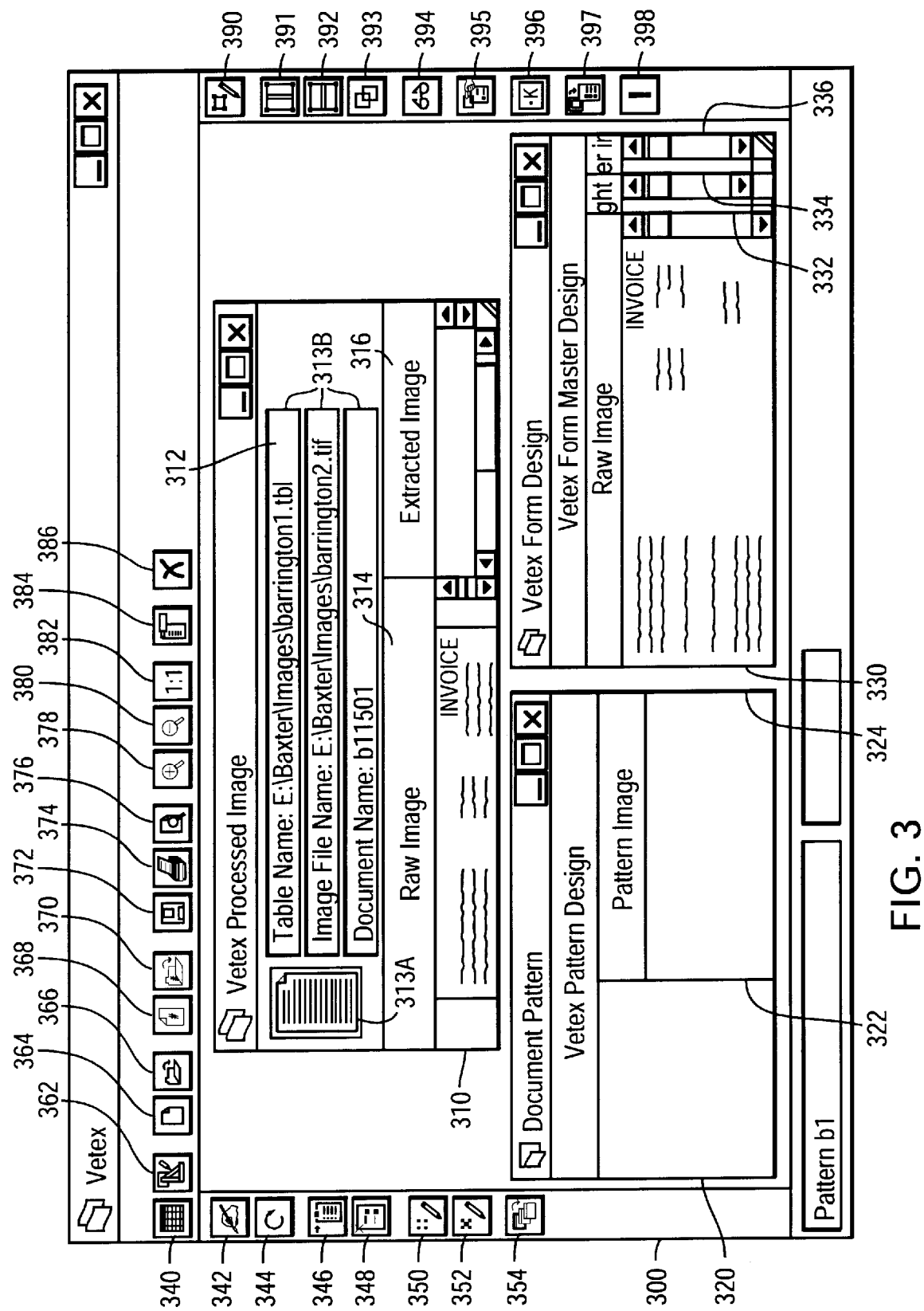
FIG. 3 is an illustration of a computer screen for a computer programmed to perform data extraction and master document image production.

Again, the system can be comprised of a computer system being responsive to a program operating therein. The programmed computer system comprises image enhancer 220, zone mapper 226, zone OCR 232, and pattern mapper 238. This is indicated by the dashed line box 250 in FIG. 2. In FIG. 3, an illustration of a computer screen 300 of a computer that has been programmed to provide the functionality of data extraction system 100 and master document image production system 200 is shown. In the three windows are shown the processes used in the two systems. In window 310 is shown the beginning of the data extraction process performed by system 100. Three tiled windows 312, 314, and 316 are shown in this window. Window 312 includes a thumbnail image 313A of the raw image and database information 313B. Window 314 contains a larger version of the raw image. Window 316 provides the extracted image. Windows 320 and 330 are used in the master document image production system 200. Window 320 is used to create the pattern and is shown having two currently empty tiled windows 322 and 324. Windows 322 and 324 display the extracted image and the template imager, respectively. Window 330 is shown having three cascaded windows 332, 334, 336 that display the raw image, the enhanced image or straight image, and the master document image, respectively.

Master Document Image, Template, Zone and Pattern Creation Process

The following process creates the master document that is used to start the data extraction process. In the computer, the screen shown in FIG. 3 is presented to the user. The icons starting at the top and continuing down the left side of the screen are:

FORM MASTER DESIGN, 340
CREATE ERASE ZONES, 342
ERASE HIGHLIGHTED AREA, 344
PREPROCESS SETTINGS, 346
IMAGE ENHANCEMENT SETTINGS, 348
DRAW DATA ZONES, 350
DRAW MARK SENSE ZONES, 352
PROCESS IMAGES, 354

The icons starting at the top of the screen, going across the top from the left, are:

FORM MASTER DESIGN, 340
PATTERN DESIGN SCREEN, 362
CREATE NEW TABLE FILE, 364
OPEN TABLE FILE, 366
CREATE NEW PATTERN, 368
OPEN PATTERN, 370
SAVE, 372
PRINT, 374
PRINT PREVIEW, 376
ZOOM IN, 378
ZOOM OUT, 380
SHOW IMAGE PIXEL BY PIXEL, 382
DOCUMENT PROPERTIES, 384
DELETE, 386

The icons on the right side of the screen starting at the top and going down are:

CREATE OCR ZONES, 390
ADD OCR ZONES HORIZONTALLY, 391
GROUP OCR ZONES VERTICALLY, 392
UNGROUP OCR ZONES, 393
PERFORM OCR ON IMAGE, 394
ZONE PROPERTIES, 395
SHOW INVISIBLE CHARACTERS, 396
SELECT DATA, 397
TEST DATA CAPTURE, 398

Associated with each of these icons is a software program or routine that will perform the indicated function and will be run when the icon is selected or clicked on by the user.

The first step in process to create a master document creates a table file for the master image by having the user click on the icon CREATE NEW TABLE FILE. In response to that user action, screen image 401 shown in FIG. 4A appears. As shown there, the user enters a file name in box 403. After clicking OPEN button 413, screen image 405, shown in FIG. 4B, appears, prompting the user to select an image to be used as the master document. Box 409 presents a list of images 407. The user highlights a particular image of interest, in this case, the file baringtonl. tif, 411, using that image as the master document. The system presents screen 420 shown in FIG. 4C to the user in response to clicking on OPEN button 413. The user is prompted at 421 to give the new master document file a name which is entered in box 422. After entering a master document name, the user clicks on OK button 424 to save the new master document under the name entered in box 422. Alternatively, an existing table file can be used in which case the user clicks on icon OPEN TABLE FILE 366. As a result of that action, a screen image (not shown) similar to that shown in FIG. 4A appears listing the current table files. The user highlights the desired file and double clicks on it to open it or clicks on the OPEN button.

Figure 4A:
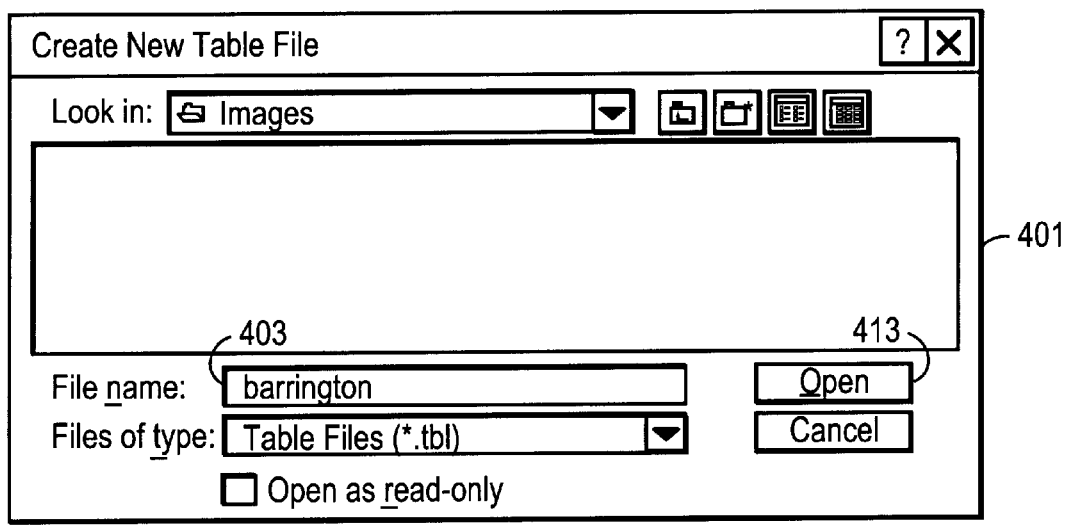
FIGS. 4A, 4B and 4C illustrate screens presented to a user for the creation of a new table file, opening an existing table file and for naming the new file, respectively used in the creation of a new master document image.
Figure 4B:
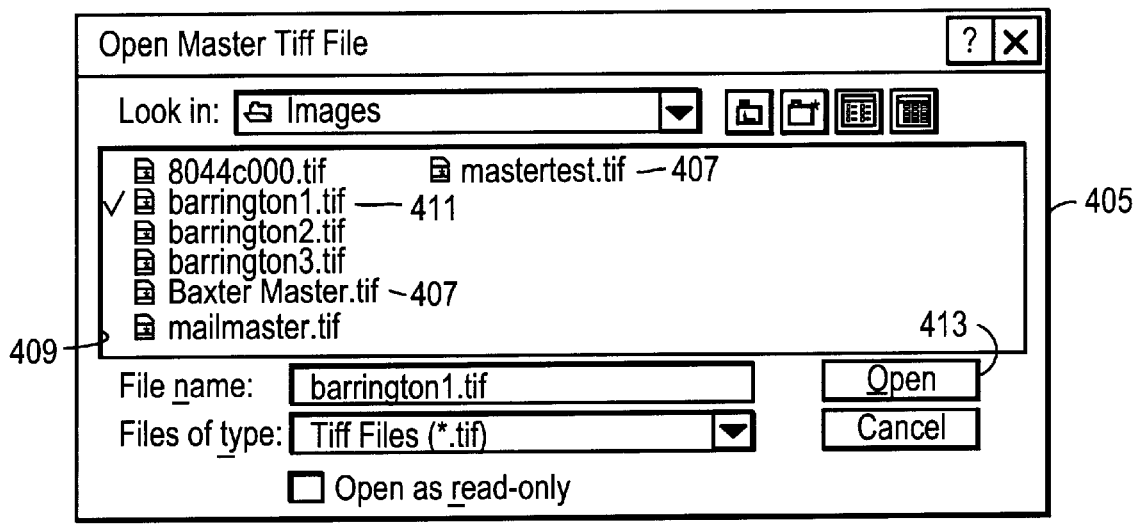
Figure 4C:
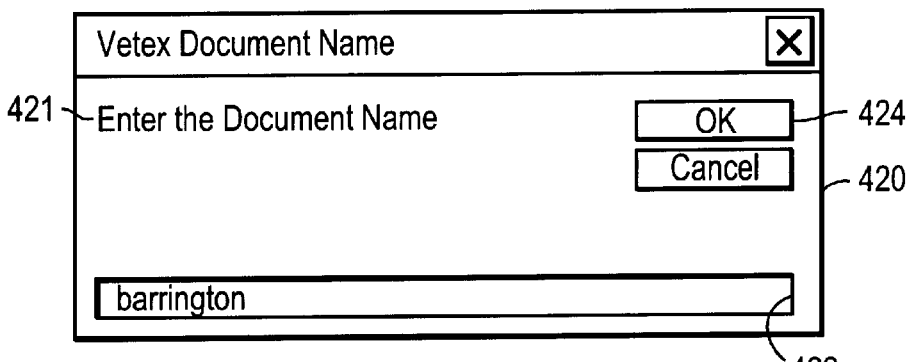

In looking at the screens presented to the user in FIGS. 4A–4C, these screens are creating a table file, then opening a master document image file or, as shown there, opening a new image to create a master document image file. After the naming and creating of the master document image file, the user receives the raw image of the scanned document that is used to create the master document image. This raw image can be seen in FIG. 5A.

In FIG. 5A, a copy of an invoice 500 containing data is shown. Invoice 500 is used to create master document image 550 shown in FIG. 5B. On invoice 500 shown in FIG. 5A are various regions such as, SHIP TO region 501, SHIP TO ACCOUNTS region 502, SOLD TO region 503, REMIT TO region 504, PAYMENT TERMS region 505, INVOICE DATE and INVOICE NUMBER regions 506, 507, QUANTITY column region 508, UNITS PER CASE column region 509, CATALOG NUMBER column region 510, PRODUCT DESCRIPTION column region 511, SIZE column region 512, UNIT PRICE column region 513, AMOUNT column region 514, TOTAL region 515, regions presenting information are helpful text such as regions 516, 517, SOLD TO ACCOUNT NO. region 518, and CUSTOMER PURCHASE ORDER NUMBER region 519. Also, numerous horizontal lines 520 and vertical lines 521 on the form indicate the various regions. Printer's mark 522 and speckling 523 are also visible. Variable data is shown entered in most of the regions described.

Figure 6A:
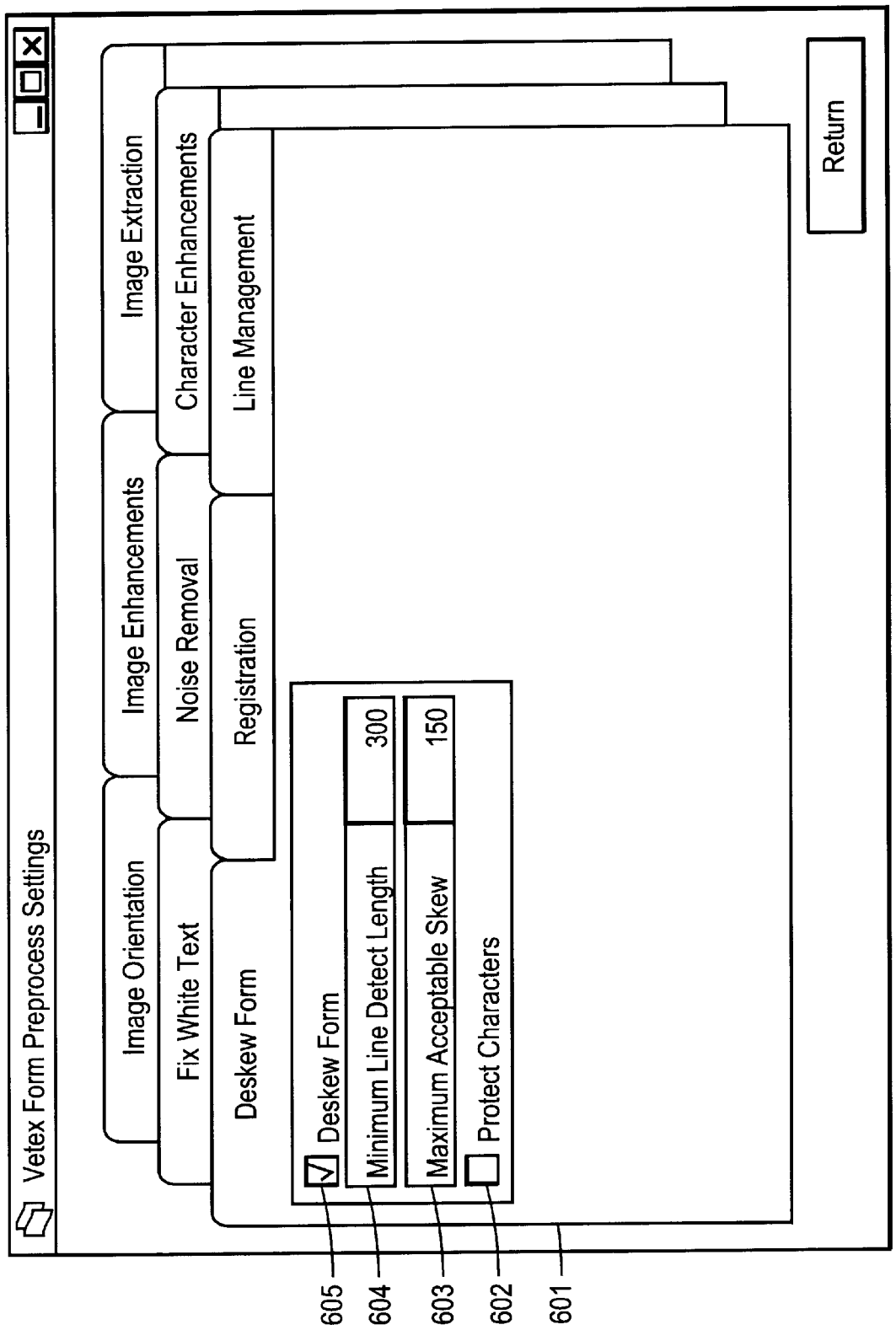

Raw image 500 is straightened and enhanced and data is removed from it to create the master document image 550. Before the raw image can be used, system deskews and registers the scanned image. Sometimes when a document is fed into a scanner, it is slightly crooked or skewed. The purpose of the deskewing is to straighten the image. Shown in FIG. 6A is menu 601 which allows the user to set the parameters used for straightening the image. To deskew the image, the Deskew Checkbox 605 is checked. Next the Maximum Line Detect Length, and the Maximum Acceptable Skew, both in pixels, are defined, as shown at box 604 and box 603, respectively. The Maximum Line Detect Length indicates the length in pixels of a vertical line and horizontal line on the form to straighten so that the vertical line is parallel with the side edge of the form and the horizontal line with the top of the form. A length of 300 pixels has been entered. The Maximum Acceptable Skew indicates the amount of allowable image movement, in pixels, to be used to straighten the form. An amount of 150 pixels has been entered. For any movement needed to straighten the image over this amount, the image will need to be re-scanned. The Protect Characters checkbox 602 is checked if it is desired to protect the character images during the deskewing process. This is normally not used. The user sets these parameters and the system deskews the form.

Shown in FIG. 6B is menu 610 presenting the options available to the user for the registration of the form. The registration menu 610 indicates the vertical and horizontal lines on the form that, when put together, will make up the form. Registration saves horizontal and vertical line data from the master document image for later use when comparing master document images to the scanned images to be processed. If the saved horizontal and vertical line data, i.e. the registration data, match the scanned image, then that scanned image is considered "recognized". For the horizontal lines, the user selects from: using Horizontal Register at checkbox 611 and setting a Resultant Left Margin in pixels at box 612, using a Horizontal Central Focus at checkbox 613, using a Horizontal Add Only at checkbox 614, setting a Horizontal Line Register amount in pixels at box 615, setting a Horizontal Line Register width in pixels at box 616, setting a Horizontal Line Register Gap in pixels at box 617, setting a Horizontal Line Register Skip Lines in pixels at box 618 and selecting a Horizontal Ignore Binder Holes at checkbox 619. Similar options are available for the vertical register. Normally only the Horizontal Register checkbox 611, the Horizontal Central Focus checkbox 613, and the Horizontal Add Only at checkbox 614 are checked along with the corresponding vertical counterparts. Also the Resultant Left Margin at box 612 and the Resultant Upper Margin at 612B are set to 150 pixels.

Horizontal Register checkbox 611 is checked and indicates that horizontal registration is used. Resultant Left Margin box 612 defines an area in pixels from the edge of the form inward where no data or lines will be found. This space is considered white space and any data found is considered noise. Horizontal Central Focus checkbox 613 is checked and indicates that the form is centered on the page. Registration is performed using the middle portion of the image border. Horizontal Add Only checkbox 614 is checked and means that white space will be added to the horizontal margins if it is less than the resultant margin specified. Horizontal Line Register box 615 specifies the length of horizontal lines, in pixels, to register. A value of zero will cause automatic horizontal line registration. Horizontal Line Register Width box 616 indicates the width, in pixels, of a horizontal line to be registered. A value of zero will cause automatic horizontal line width registration. Horizontal Line Register Gap box 617 indicates that any broken lines with a gap equal to or less than the specified amount is really the same line. The amount of the gap in pixels is entered. Here the gap amount is 8 pixels. Horizontal Line Register Skip Lines box 618 indicates the number of lines to skip from the left margin inward before registering horizontal lines. Horizontal Line Ignore Binder Holes checkbox 619, when checked, allows holes to be ignored. For example, if the scanned image has binder holes, such as a three-ring binder, then these holes will be ignored during registration.

Vertical Register checkbox 611B indicates vertical registration will be used. Resultant Upper Margin box 612B defines an area in pixels from the top of the form downward where no data or lines will be found. This space will be considered white space and any data found is considered noise. Vertical Central Focus checkbox 613B indicates that the form is centered on the page. Registration is performed using the middle portion of the image border. Vertical Add Only checkbox 614B, when checked, adds white space to the vertical margins if it is less than the resultant margin specified. Vertical Line Register 615B box specifies the length, in pixels, of vertical lines to register. A value of zero will cause automatic vertical line registration. Vertical Line Register Width box 616B indicates the width, in pixels, of vertical lines to register. A value of zero will cause automatic vertical line width registration. Vertical Line Register Gap box 617B indicates that any broken lines with a gap, as specified in pixels, is really the same line. Here a zero value has been entered. Vertical Line Register Skip Lines box 618B indicates the number of lines to skip from the left margin inward before registering vertical lines.

Figure 6C:
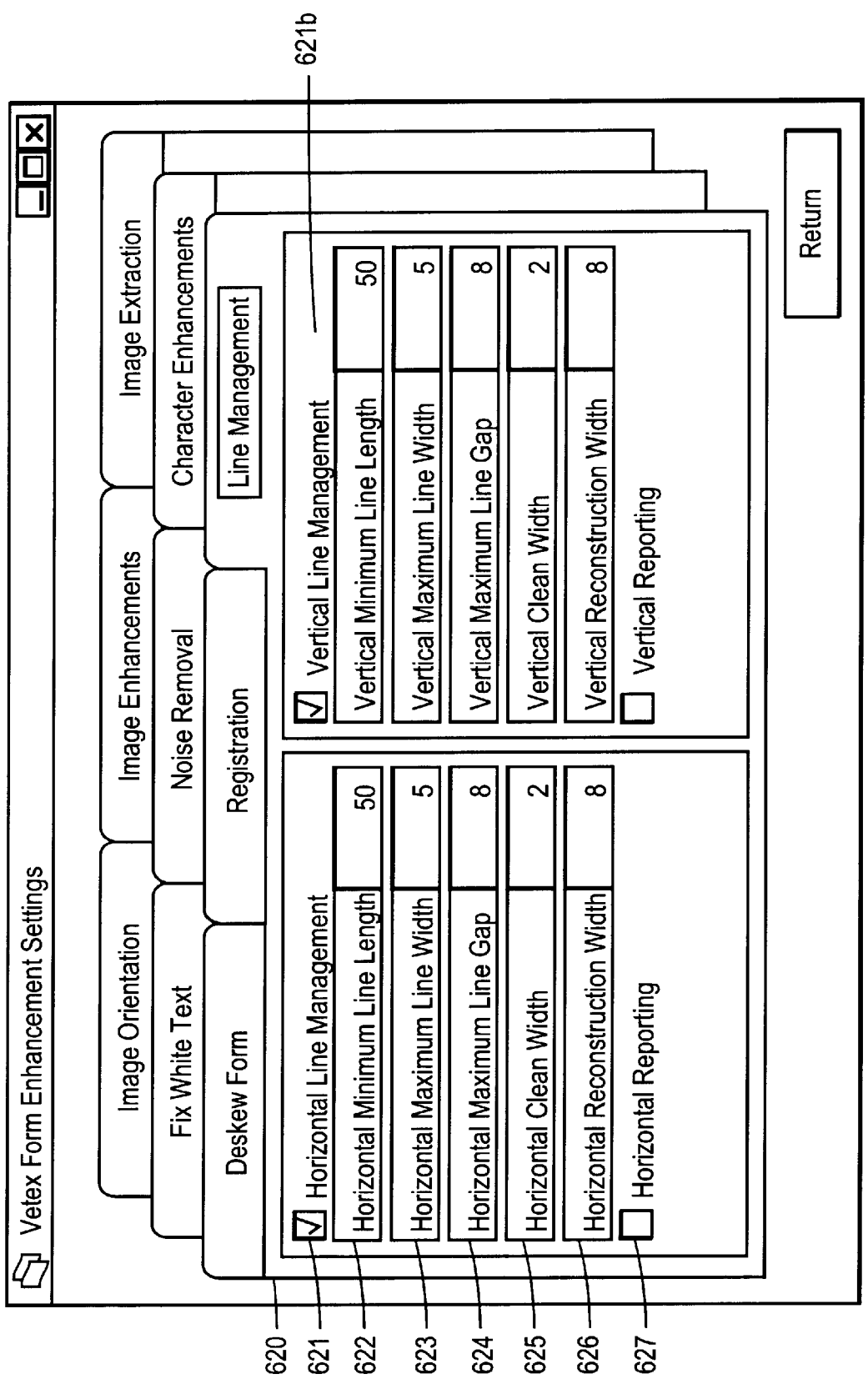

Shown in FIG. 6C is Line Management menu 620 that the system presents to the user for dealing with line management in the master document image. This screen contains the various form enhancement features. Enhancement features perform various operations on the image and data in the image. For example, noise removal will remove any black specks which may appear on the image due to the scanning process. This feature is used to remove as much non-data information as possible. If the image is relatively clean, then the only property menu necessary to use is Line Management menu 620, shown in FIG. 6C, that removes the lines on the form. By selecting the Horizontal Line Management checkbox 621, line management is enabled for horizontal lines. A similar check box is provided for enabling vertical line management. The Horizontal Minimum Line Length box 622 specifies in pixels the length of horizontal lines to remove. A setting of 50 pixels is shown. The Horizontal Maximum Line Width box 623 specifies the maximum thickness in pixels of horizontal lines. A value of 5 pixels is shown. The Horizontal Maximum Line Gap box 624 sets the number of pixels that can exist between the end of a line segment and the start of the next line segment for those segments to be considered to be the same line. A gap value of 8 pixels has been set. An example is a dashed line. The Horizontal Clean Width box 625 sets the number of pixels between a line and a character of data. Here are value of 2 pixels has been entered. The Horizontal Reconstruction Width box 626 is used when a character is on a line. When the line is removed, the program will reconstruct the character to have this number of pixels in width. A value of 8 has been selected. The Horizontal Reporting checkbox 627 is checked if this feature is wanted. Horizontal reporting will generate a report in pixels of lines found in the document. Similar functionality is provided for vertical line management which has also been selected at indicated at checkbox 621B.

Figure 6D:
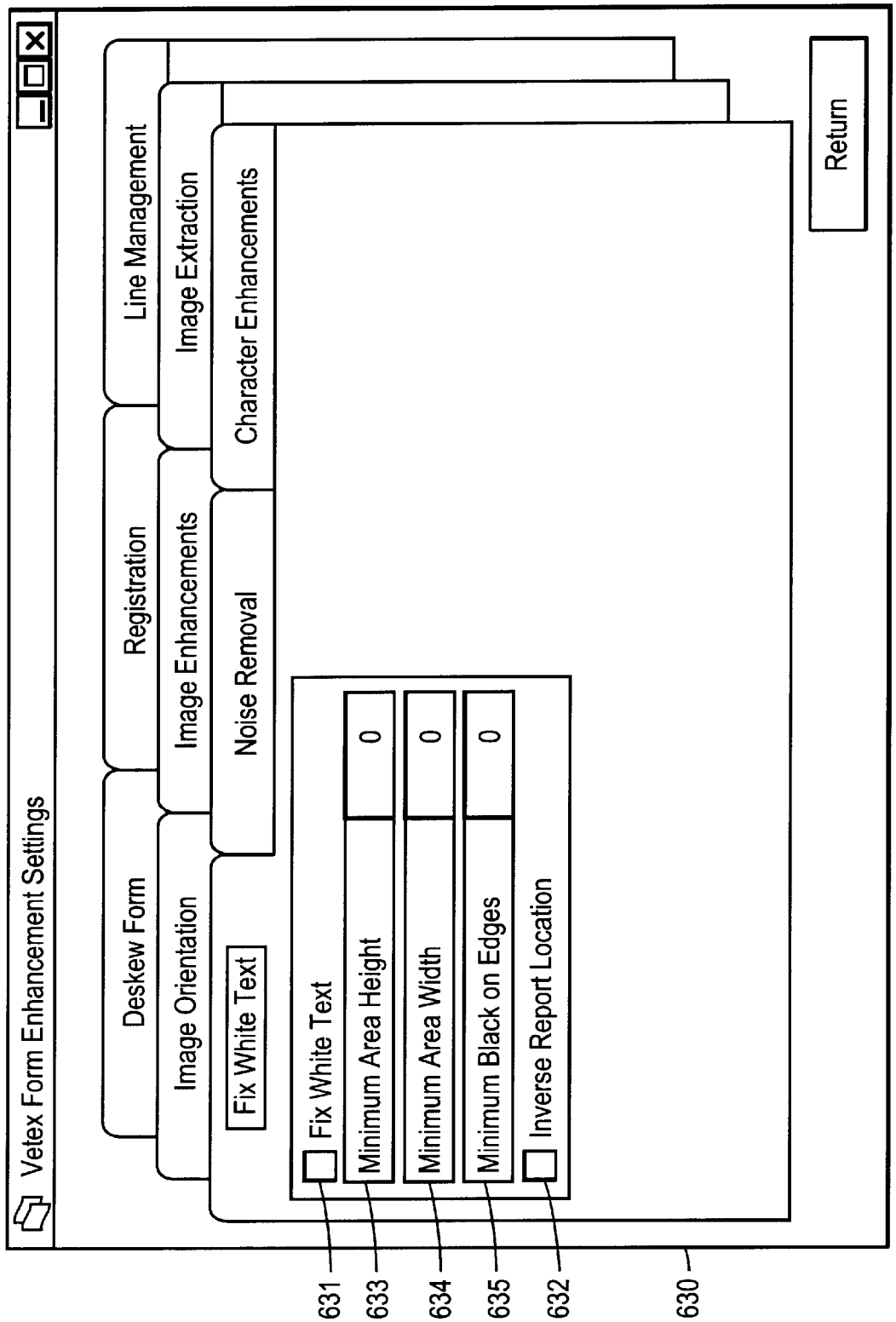

Other enhancement properties available for selection are found on Fix White Text menu 630, Image Orientation menu 640, Image Enhancements menu 650, Noise Removal menu 660, Character Enhancements menu 680, and Image Extraction menu 690 illustrated in FIGS. 6D–6I, respectively. In Fix White Text Menu 630 shown in FIG. 6D are provided Fix White Test check box 631 and Inverse Report Location check box 632. Also provided are Minimum Area Height box 633, Minimum Area Width box 634, and Minimum Black on Edges box 635 into each of which of these boxes a pixel value would be entered. Fix White Text checkbox 631 enables the system to detect white text. White text is created by white letters on a black background. Minimum Area Height box 633 specifies in pixels the height of the white characters. Minimum Area Width box 634 specifies in pixels the width of the character formed in the black background. Minimum Black on Edges box 635 specifies in pixels the minimum height of the black background. Inverse Report Location checkbox 632, when checked, generates a report of the position, in pixels, of the white text.

Figure 6E:
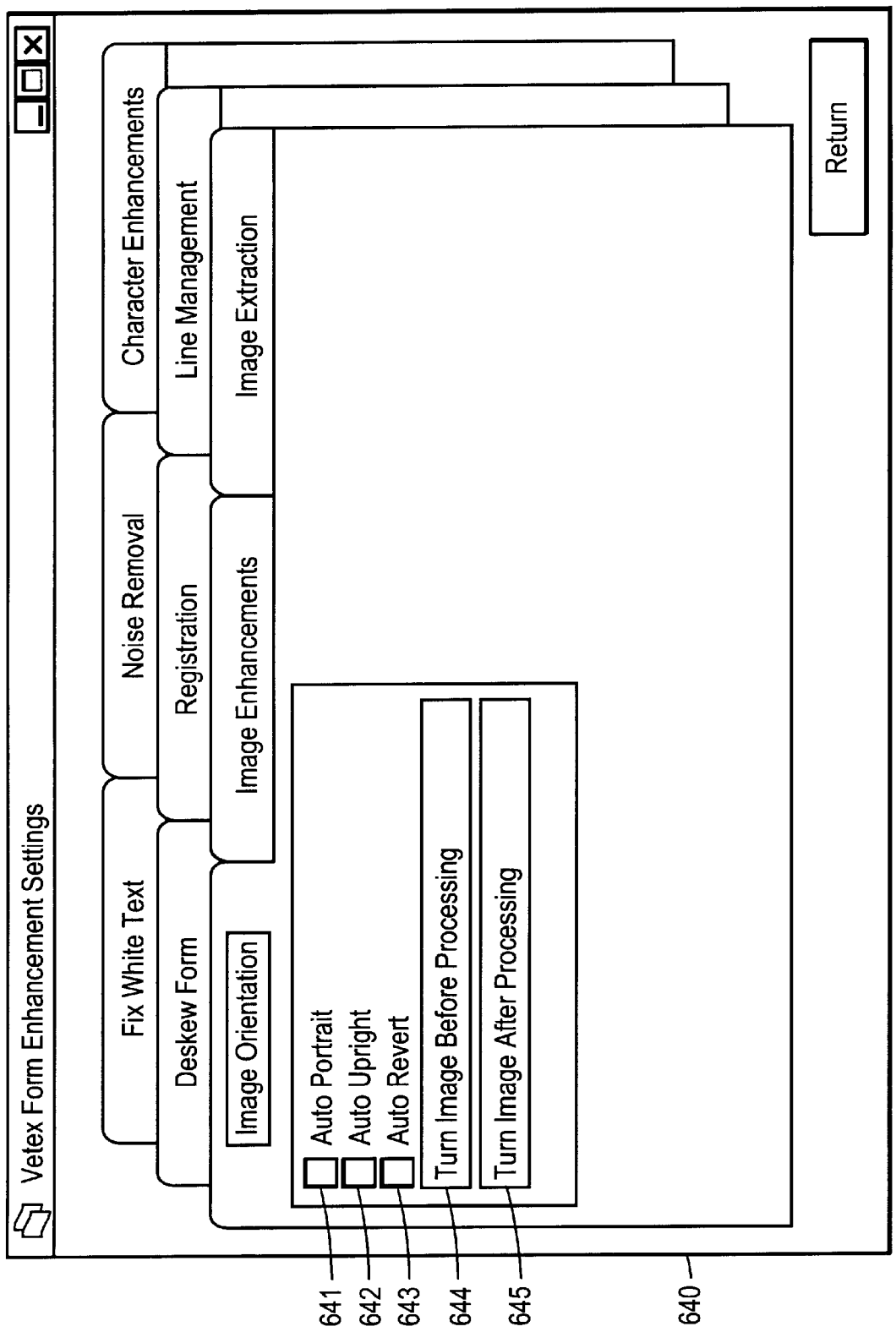

In FIG. 6E, Image Orientation menu 640 provides three checkboxes, Auto Portrait 641, Auto Upright 642, Auto Revert 643 in addition to selection boxes Turn Image Before Processing 644 and Turn Image After Processing 645. If Auto Portrait checkbox 641 is checked, when a landscape-oriented form is feed in the scanner, this option will rotate the image 90 degrees so the image can be read on the computer screen without turning the screen. If Auto Upright checkbox 642 is checked, when a form is feed upside-down in the scanner, this option will rotate the image 180 degrees so the image can be read on the computer screen. When Auto Revert checkbox 643 is checked if the image was rotated in order for it to be read on the screen, then the Auto Revert function will cause the system to store a copy of the original image before the rotation, as well as, the rotated copy.

Figure 6F:
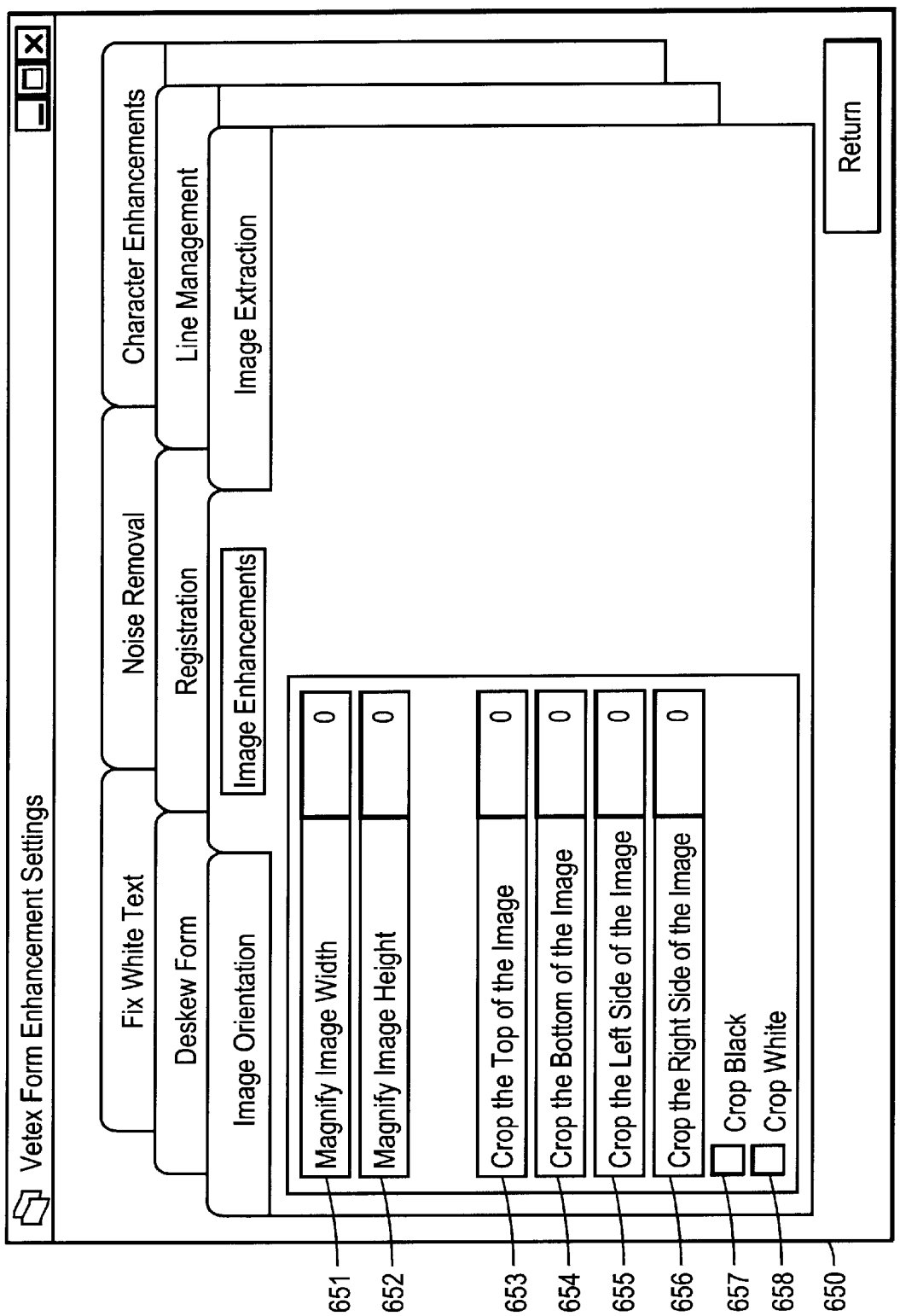

In Image Enhancements menu 650 of FIG. 6F, six value boxes are provided. These are Magnify Image Width 651, Magnify Image Height 652, Drop the Top of the Image 653, Crop the Bottom of the Image 654, Crop the Left Side of the Image 655, Crop the Right Side of the Image 656. In boxes 651 and 652, the number or value entered would be the percentage of magnification. In boxes 653 through 656, the value entered would be the amount of pixels to crop the various portion of the image. In addition, a Crop Black checkbox 657 and a Crop White checkbox 658 are provided. Standard forms are typically 8.5 inches wide by 11 inches high, forms smaller in size say 4 inches wide by 1.5 inches wide can be magnified using Magnify Image Width box 651. The magnification of the width of the image is specified in pixels. Similarly, the magnification of the height of the image can be specified in pixels by entering a value in the Magnify Image Height box 652. Entering a value in pixel in the Crop the Top of the Image box 653 specifies the length from the top of the form down that is to be removed from the image. Similarly, Crop the Bottom of the Image box 654 specifies, in pixels, the length from the bottom of the form up to remove from the image. Crop the Left Side of the Image box 655 specifies in pixels the length from the left side of the form to the right to remove from the image. Crop the Right Side of the Image box 656 specifies in pixels the length from the right of the form to the left to remove from the image. Crop Black checkbox 657, when checked, removes the black space from around the outer edges of the scanned image. Crop White checkbox 658, when checked, will remove the white space from around the outer edges of the scanned image.

In FIG. 6G, Noise Removal menu 660 is illustrated. Four despeckle boxes are provided. These are Horizontal Despeck box 661, Vertical Despeck box 662, Isolated Despeck box 663, Isolated Despeck Width 664. The values as set in these boxes are in pixels and indicate the size of the speckling that will be removed. Dot Shading occurs when black characters are placed on a gray shaded area. Laser printers often create gray shaded areas by speckling the area with toner. OCR engines have a difficult time recognizing the black characters on this gray background. Dot Shading Removal Checkbox 665, when checked, removes gray shaded areas from the image. Minimum Area Despeck Height box 666 and Minimum Area Despeck Width box 667 specify, in pixels, the height and width, respectively, of gray shaded areas. Maximum Speck Size box 668 specifies in pixels the width of the gray shaded specks. Horizontal Size Adjustment box 669 and Vertical Size Adjustment box 671 specify in pixels the width and height, respectively of the adjustment of the Maximum Speck Size to ensure successful removal of gray specks. Character Protection box 672, when enabled, does not remove specks that touch characters since this will remove part of the character. Despeck Report Location checkbox 673, when checked, provides a report of the location(s) of the gray shaded areas removed.

Figure 6H:
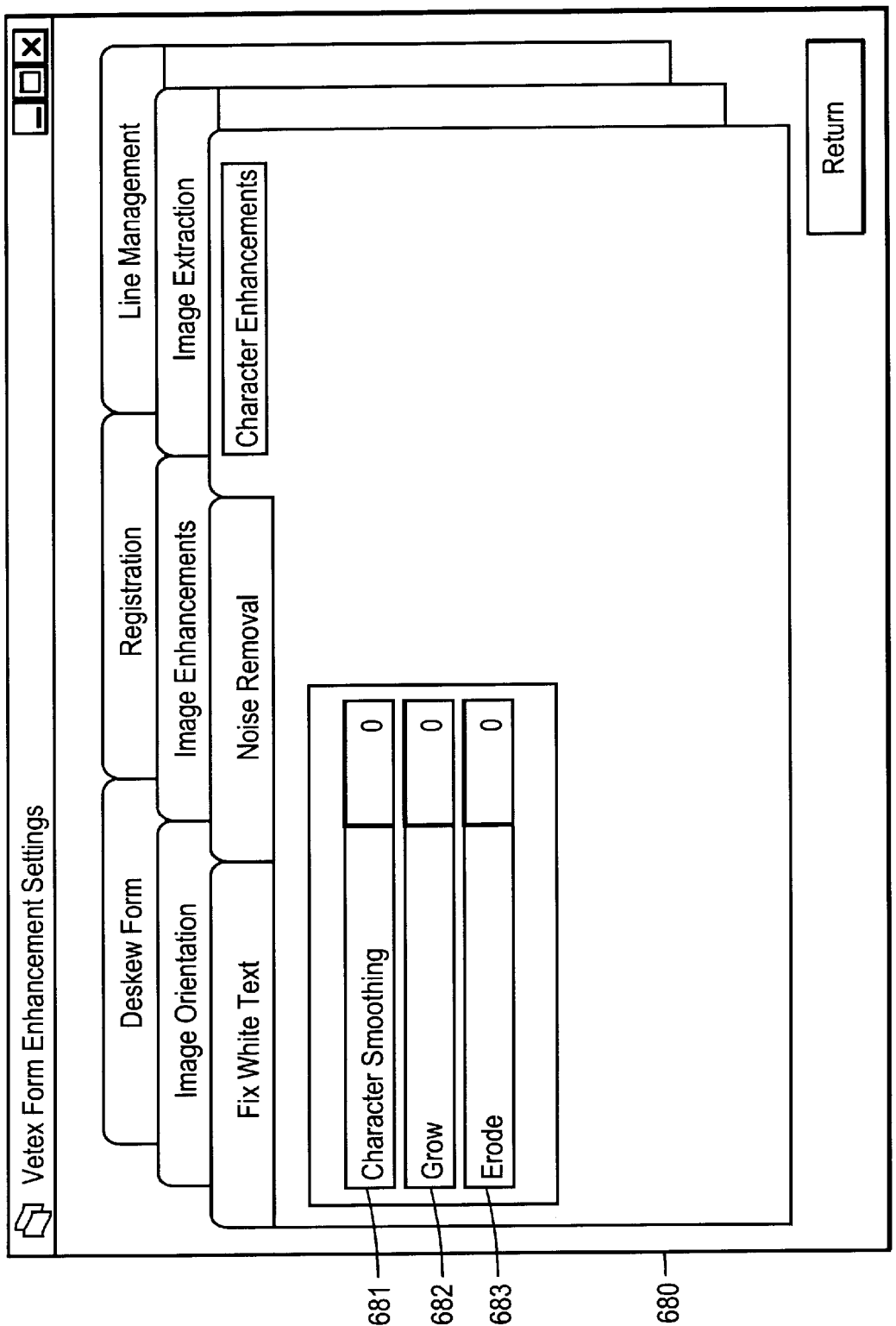

In FIG. 6H, Character Enhancements menu 680 is illustrated. Provided in this menu are three value boxes, Character Smoothing 681, Grow 682 and Erode 683. Character Smoothing box 681 specifies the width, in pixels, of the characters in the enhanced image. Any pits or bumps are removed from the character. Grow box 682 specifies the amount, in pixels, which the width of characters are to be enlarged while Erode box 683 specifies the amount, in pixels, which the width of characters are to be reduced.

Figure 6I:
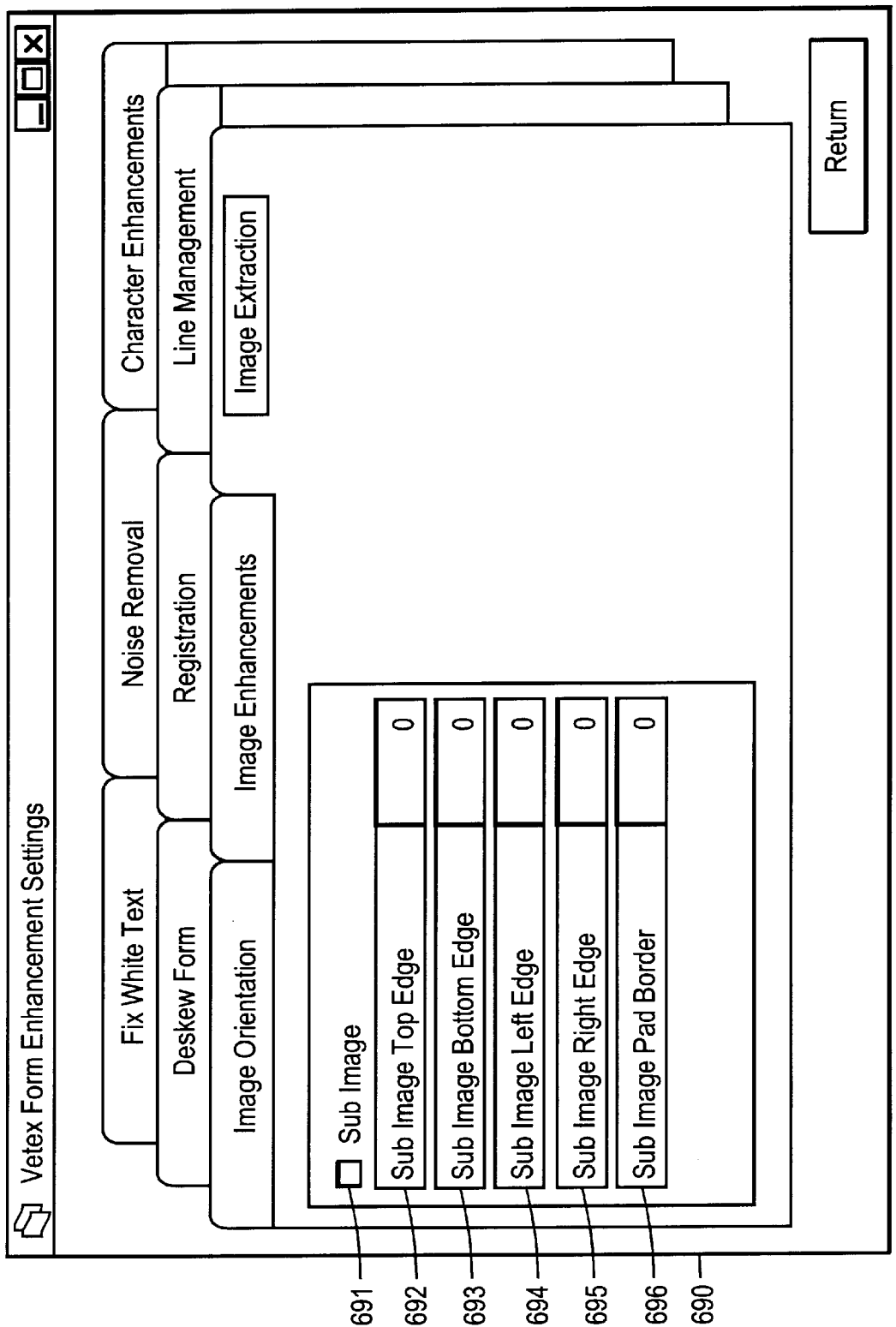

In FIG. 6I, Image Extraction menu 690 is shown. Provided in this menu is Sub Image checkbox 691. When this box is checked, a sub-image will be extracted from the image. Also provided are five value boxes Sub Image Top Edge 692, Sub Image Bottom Edge 693, Sub Image Left Edge 694, Sub Image Right Edge 695 and Sub Image Pad Border 696. Into each of these boxes, a value in pixels will be provided and determines the following:

Sub Image Top Edge specifies the number of pixels down from top of the image to begin extracting the sub-image;

Sub Image Bottom Edge specifies the number of pixels down from the top of the image to stop extracting the sub image;

Sub Image Left Edge specifies the number of pixels from the left edge of the image to begin extracting the sub-image; and Sub Image Right Edge specifies the number of pixels from the left edge of the image to stop extracting the sub image.

Software which performs these image enhancements shown in FIGS. 6A–6I is well known in the art. One such software package which provides image enhancement is FormFix available from TMS Sequoia of 206 West 6th Avenue, Stillwater, Okla. 74074, world wide web address: www.tmsinc.com.

Figure 7:
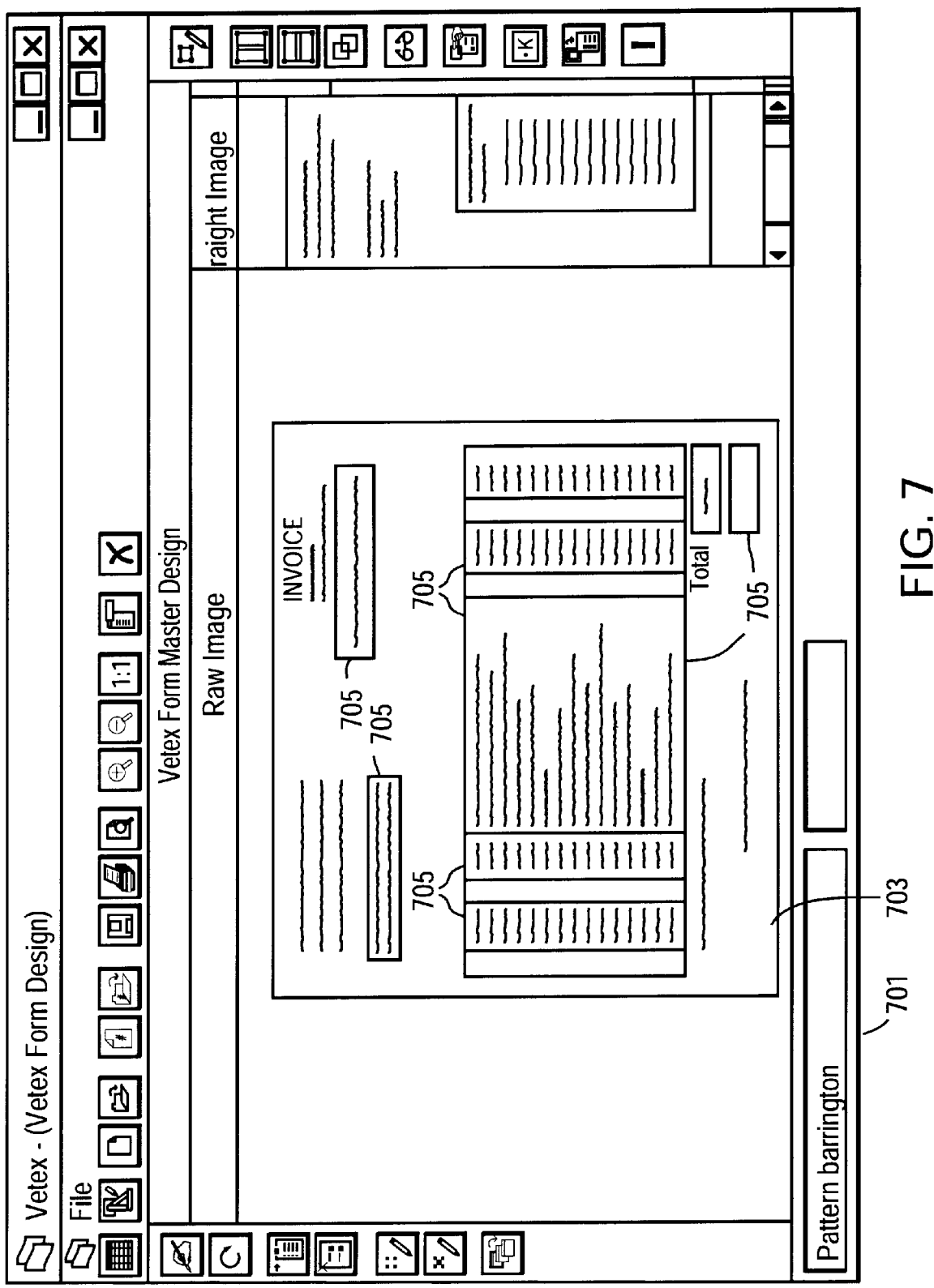
FIG. 7 illustrates a screen showing the use of erase zones in the creation of a master document image.
Figure 8:
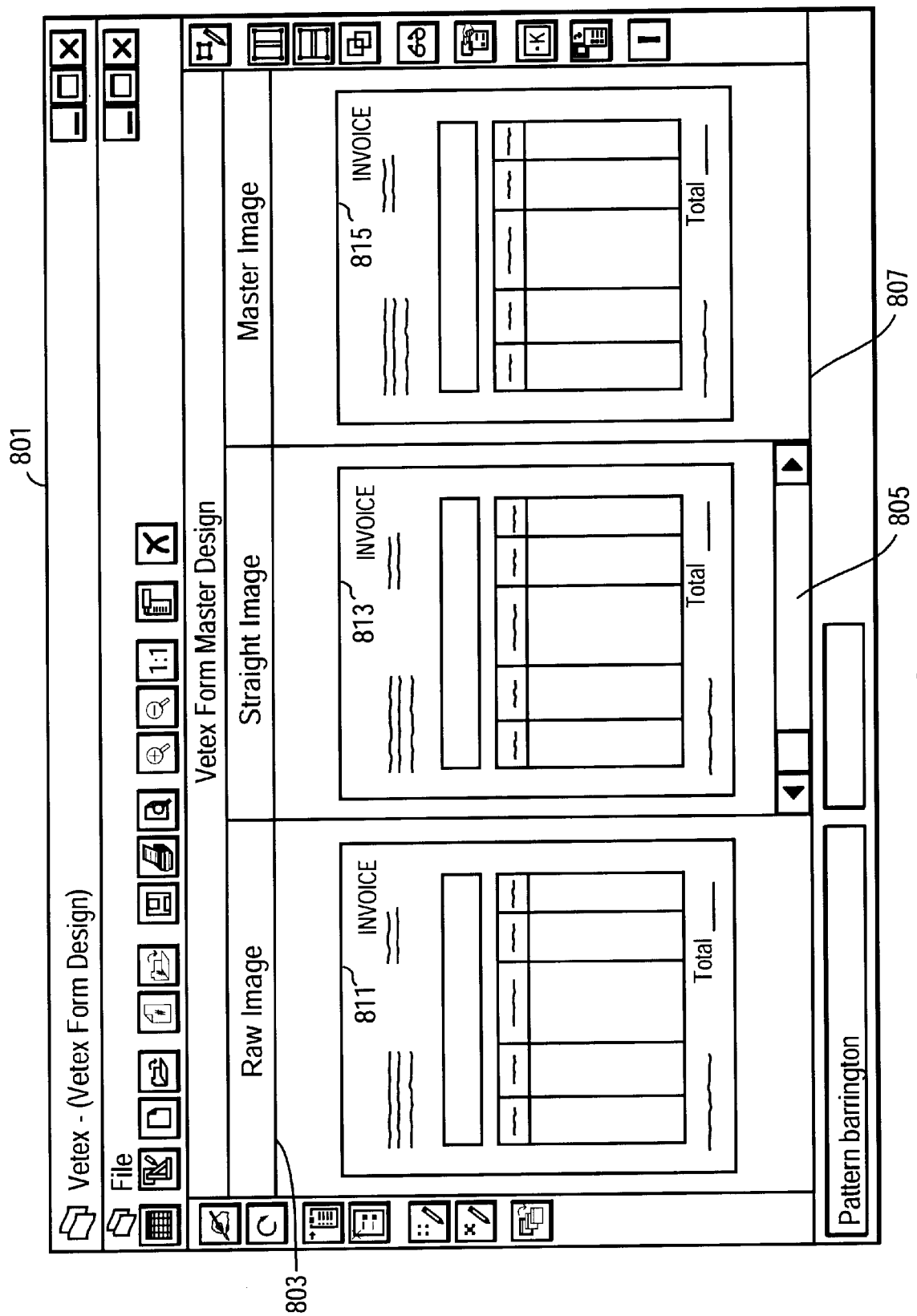
FIG. 8 illustrates a screen showing the raw image, straight image and master document image from which data has just been erased during the creation of a master document image.

After the various enhancement settings have been selected by the user, the next step creates erase zones on the images. By clicking on CREATE ERASE ZONES icon 340, the user selects and defines areas of the image which will be erased when the ERASE HIGHLIGHTED AREA icon 344 is clicked on or if the user presses the DELETE key on the computer keyboard. This is illustrated in FIG. 7 where erase zones are shown on a raw image. The erase zones remove data from the form to create a blank form. These zones can be created by the user on any of the images, the raw image, the straight image or the master document image and will remove the data contained in the zone on all three images. This is by-passed if a blank form is available to be scanned in. Otherwise, a blank form will need to be created. Shown in screen 701 is raw image 703. Erase zones 705 have been selected and the data contained therein will be erased from image 703. Shown in FIG. 8 is screen 801 having three tiled windows 803, 805, 807 displaying raw image 811, straightened or enhanced image 813, and master document image 815, respectively. The unwanted data has been removed from all three images. Once the unwanted data has been removed, the master document image has been created. Data which is to be used to define the patterns used for data extraction is typically not deleted at this step in the process. It will be understood that the user can perform these steps in various orders or at different times during the process of creating a master document image.

Figure 9:
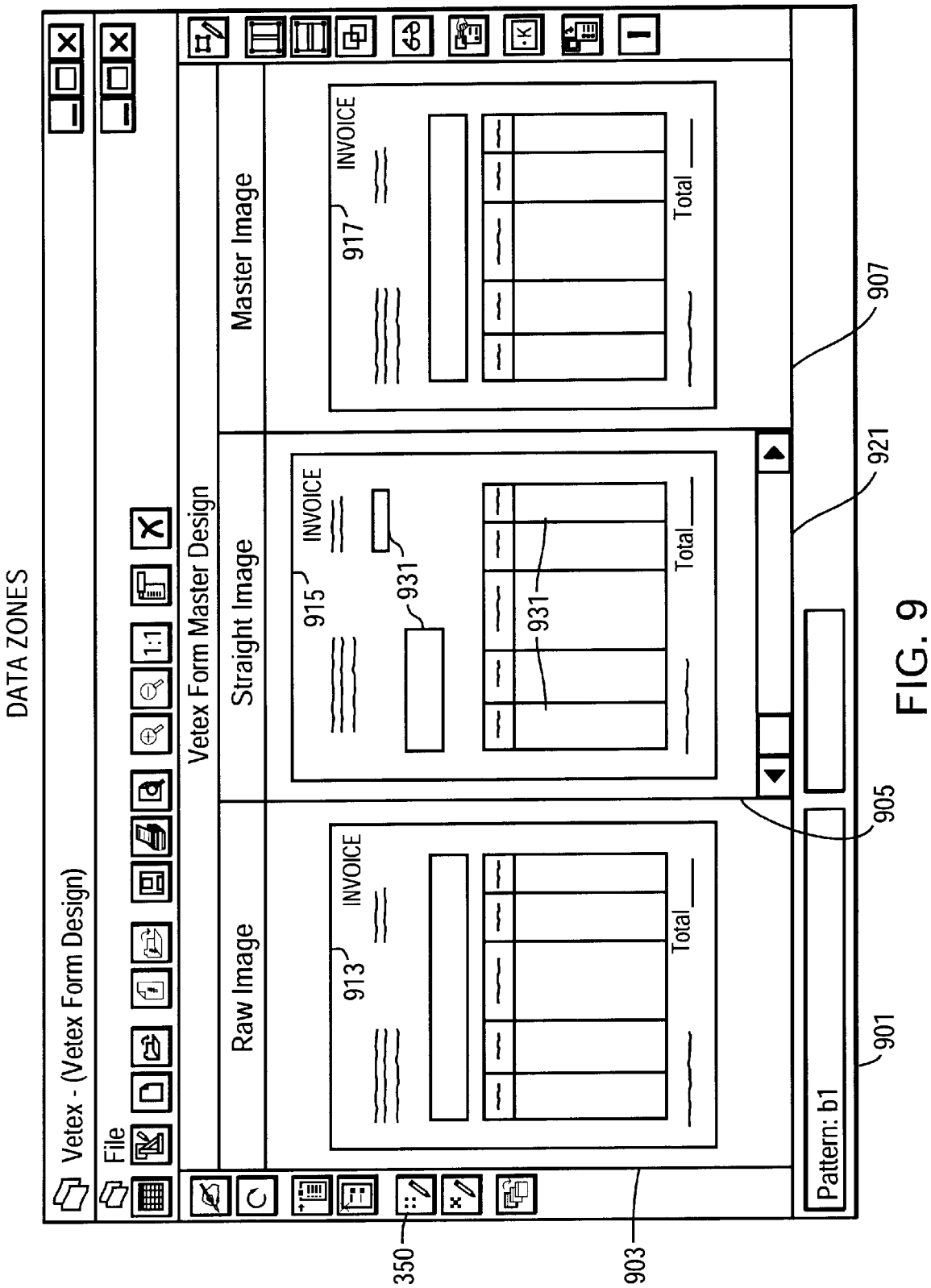
FIG. 9 illustrates data zones on a document image that is being used to create a master document image.

Data zones are drawn on the enhanced image by clicking on the DRAW DATA ZONES icon 350 and then selecting a zone using the mouse. Shown in FIG. 9 is screen 901 displaying three tiled windows 903, 905, 907 containing raw image 913, straight image 915 and master image 917, respectively. Window 905 is the active window as indicated by scroll bar 921. After clicking on DRAW DATA ZONES icon 350, the user selects data zones 931 on image 915 that contain data that the user wants to extract and store in a database. The selected data zones 931 are highlighted on the screen. The character images contained in these data zones are optically read and saved in a data file for each data zone as described in the following paragraph. These data zones define the template that is to used with this master document image. Once the data zone information has been saved, master document image 917 can be further enhanced (lines removed and specs removed, etc.) as described previously and stored in the table file in the master document image database 128.

Figure 10:
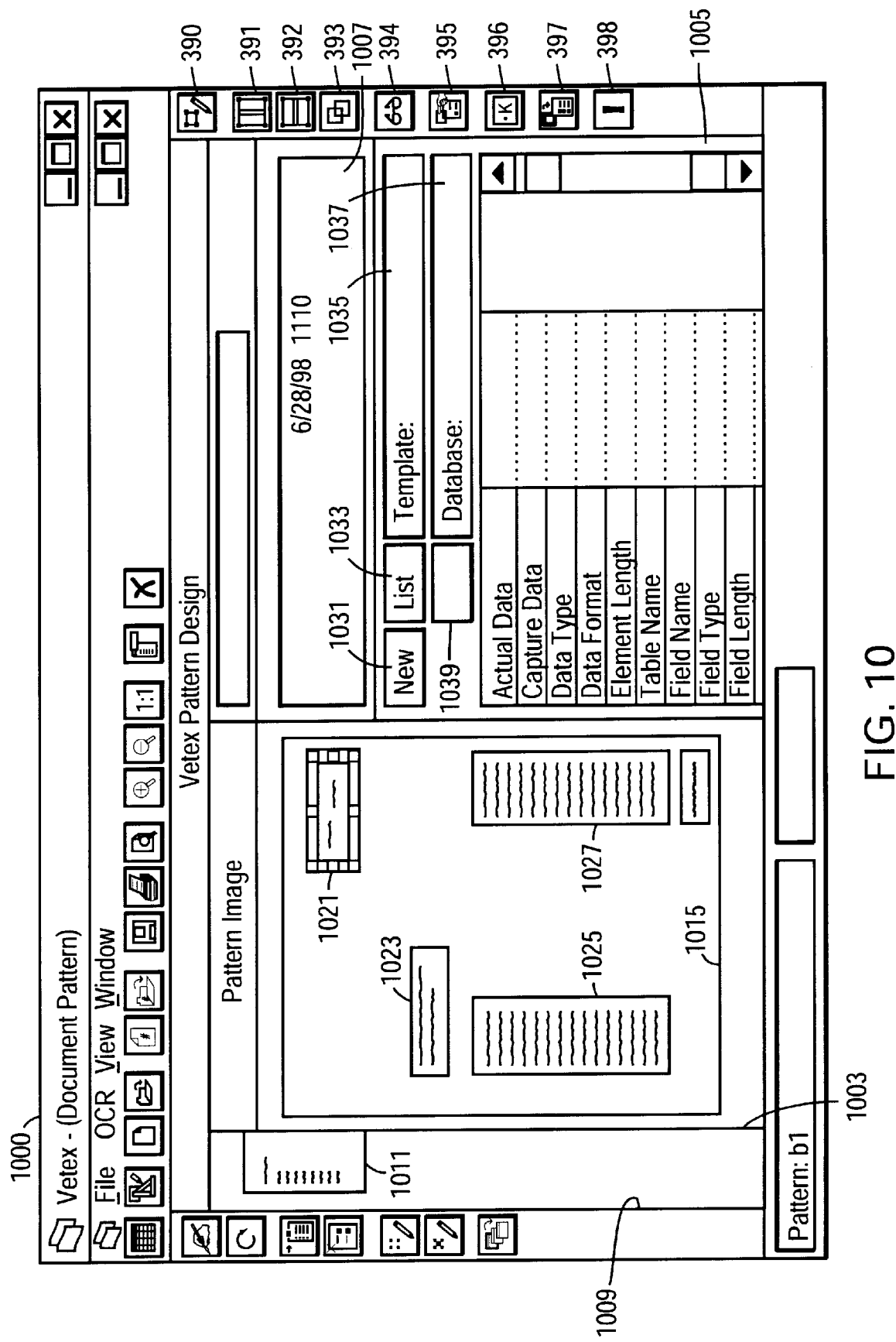
FIG. 10 illustrates the use of a OCR zone, the data contained within that zone and the data template to be used for the data contained within the highlighted OCR zone to create a pattern.

After or during the creation of the master document image, the user creates the unique character pattern used with each data zone that has been created. Shown in FIG. 10 is an illustration of screen 1000 used for the creation of a pattern. Here, the user creates data templates and assigns the data to fields in the database. For instance, phone numbers and social security numbers are easy patterns to create. A phone number used in the United States has a distinct pattern of three numbers then a dash, period or space followed by three numbers and a dash, period or space followed by four numbers. A social security number has a pattern of three numbers, a dash, two numbers, a dash and then four numbers. The patterns are defined within the data so that the pattern can be detected and then the data extracted. Unlike other forms of document image processing systems, the data extracted is recognized using these character patterns rather than by the using graphic position or pixel location of the data within the image.

In FIG. 10 the pattern design process displays several windows. Three windows 1003, 1005, 1007 are shown overlaying window 1009 that contains thumbnail image 1011 of the master document image. In window 1003 is shown pattern image 1015. The top right window 1007 is an OCR window and beneath that in window 1005 is the data template pattern design window for the database. In window 1003, by using the various OCR icons 390–393 previously described, the user creates OCR zones 1021, 1023, 1025 1027 around the data that is to be captured. These zones are indicated by the rectangles in pattern image 1015. Once the OCR zones have been created, the user clicks on PERFORM OCR ON IMAGE icon 394. The OCRed data zones, when highlighted, appear in the upper right OCR window 1007. OCR zone 1021 in image 1015 is highlighted and the data shown in OCR window 1007 are the characters "Jun. 28, 1998, 1110" which comprise the INVOICE DATE and the INVOICE NUMBER regions. The OCR window 1007 highlights the particular characters that make up a particular data pattern. In order to capture this information from a scanned image, the user creates a new data template or selects and open an existing data template. Selecting either NEW button 1031 or LIST 1033 button shown in window 1005 accomplishes this. Pressing NEW button 1031 displays a screen prompting the user to enter a name for the new data template which then appears in box 1035. Pressing LIST button 1033 displays a list of existing data templates for selection by the user. A database is selected by entering its name in box 1037 or a new database is created by selecting button 1039. After the template and database have been named and selected, window 1005 will display the selected data template or, in the case of a new template, will display a default data template for the selected database.

Figure 11:
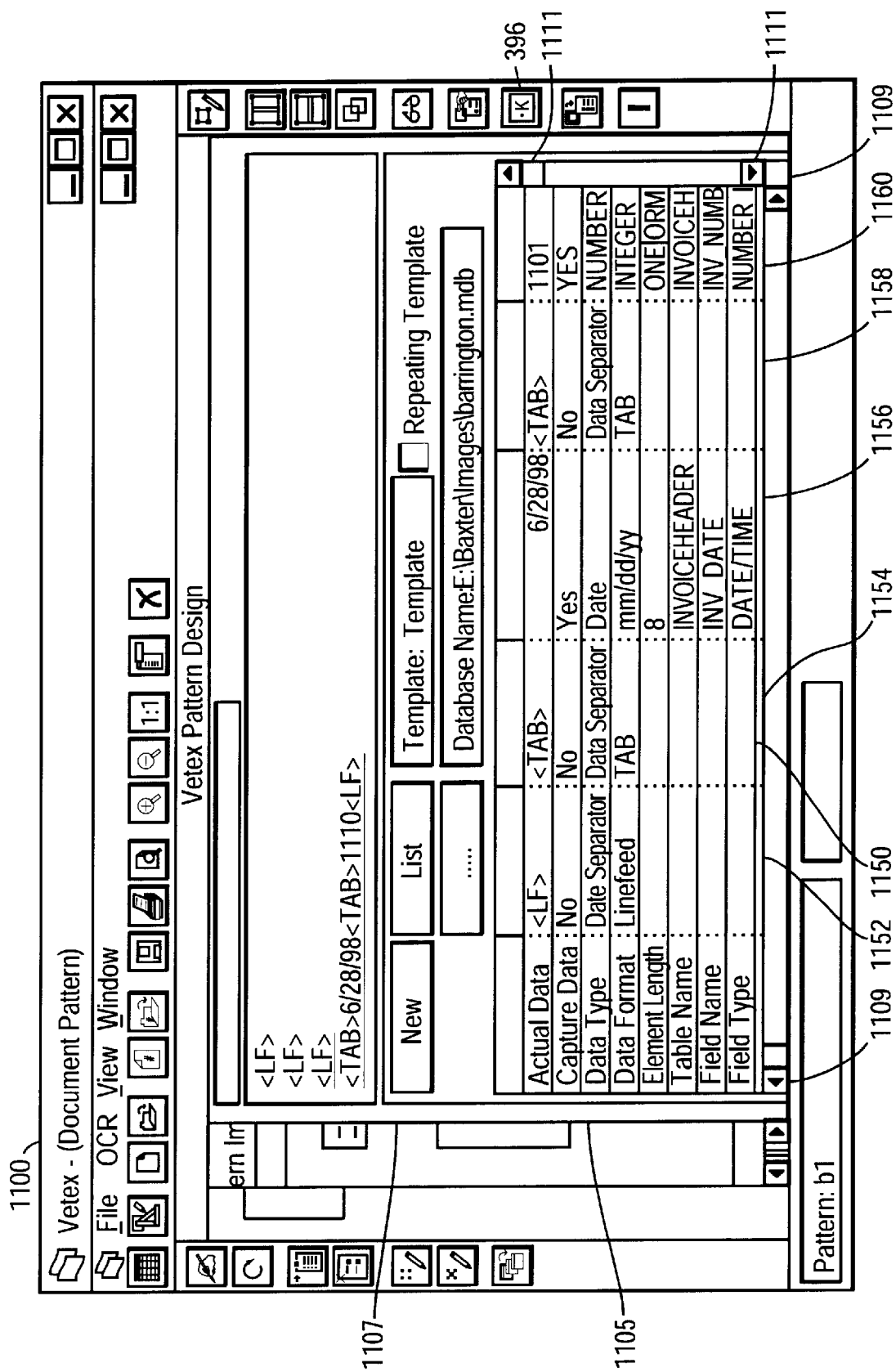
FIG. 11 is an enlargement of the data template and OCR window of FIG. 10 showing the correlation between the data contained in the image and that used in the data template.

In order to create a pattern, the user selects SHOW INVISIBLE CHARACTERS icon 396 to display hidden characters that help to identify and create a pattern for the selected OCR zone. The hidden characters are ASCII control characters and appear typically as white space in the image. These hidden characters are shown in FIG. 11 in window 1007 of screen 1100. Window 1105 is the expanded version of window 1005 and OCR window 1107 is the expanded version of window 1007. As can be seen in the image for the INVOICE DATE and INVOICE NUMBER regions, there are three ASCII line feed characters (<LF>) and the ASCII tab (<TAB>) character that can be used to form part of the pattern. In this case, the two initial line feed characters are not used and the pattern is defined to begin with the line feed and TAB characters occurring just prior to the beginning of the date information. The character sequence defining the pattern appears underlined in window 1107. Data template 1150 has the appearance of a table and is comprised of a variable number of data segments 1152–1160 appearing as columns. The actual data appears at the head of each column with the remaining rows in each column providing characteristics associated with that particular data segment. Each character or group of characters in a data segment is selected and dragged from window 1107 and dropped into a data segment in data template 1150 shown in window 1105. In data segment 1152 the line feed character <LF> is shown inserted in the row designated ACTUAL DATA. In data segment 1154 the TAB character is inserted. In data segment 1156 the date information is inserted. In data segment 1158 the TAB character is inserted and in data segment 1160 the invoice number is inserted. The last character used in the data pattern, a line feed character is inserted in the last data segment which is not shown in this view of the window 1105. In order to obtain more segments for the entry of data, scroll buttons 1109 at the bottom of window 1105 are used to scroll the template to the left or right as indicated by the arrowheads. In this case, by scrolling the data template to the left, an additional data segment is available to insert the final line feed character of the pattern.

For each data segment that is entered into the data template, the system directs the user to select and complete the following options: Capture Data, Data Type, Data Format, Element Length, Table Name, Field Name, Field Type, Field Length and Validation. By using the vertical scroll buttons 1111, these last two characteristics can be brought into view. The characteristic Capture Data indicates whether or not to store the data in the database. Data Type indicates the type of data such as a constant, date, date separator, number and text. Data Format indicates the type of format used for the data in that data segment such as a date having the format MM/DD/YY.

Element Length indicates how many visible characters comprise the data. For fixed length data, a number is entered. For variable length data either "Zero or one time" or "Zero or more times" or "One or more times" is entered. "Zero or one time" indicates length of the data may not exist and if it does will be of fixed length as indicated in field length. "Zero or more times" indicates that the data may not exist but if it does will be of variable length. "One or more times" indicates that the data will exist and will be of variable length. Table Name is the name of the database table in which this data template will be stored. Field Name is the name of the data field to store the data in table. Field Type is the database field type as required by the database definition, such as integer, decimal, character, etc. Field Length is the size of the field as required by the database definition, usually the number of bytes or characters. Validation is used to indicate is the data is to be validated by an operator before being committed to the database.

The line feed character in data segment 1152 has the following characteristics: Capture Data=No, Data Type= Data Separator, and Data Format=Linefeed. The other characteristics are blank. The data in this segment is not stored. For data segment 1154, the TAB character characteristics are: Capture Data=No, Data Type=Data Separator, and Data Format=TAB. The remaining characteristics are blank. Again the data in this segment is not stored. For the date data in segment 1156 its characteristics are: Capture Data=Yes, Data Type=Date, Data Format=MM/DD/YY, Element Length=8, Table Name=InvoiceHeader, Field Name=INV_ DATE, Field Type=Date/Time, Field Length=Blank, and Validation=None. The information for Field Length and Validation cannot be seen on this screen and will need to scrolled into view. This data is stored in the database in the data field INV-DATE. For data segment 1158 the characteristics for the TAB character are the same as that given for data segment 1154. For the last element shown which is the invoice number, Capture Data=Yes, Data Type=Number, Data Format=Integer, Element Length=One or More Times, Table Name=InvoiceHeader, and Field Name=INV_DATE. To see the remainder of the pattern, the user scrolls the template to the left. Thus, for the OCR data shown in OCR window 1107, the pattern of visible and invisible characters that will be associated with this particular zone is:

<LF>, <TAB>,<MM/DD/YY>, <TAB>, <Variable Length Number>, <LF>.

and only the third and fifth data segments of the pattern are stored in the database.

Figure 12:
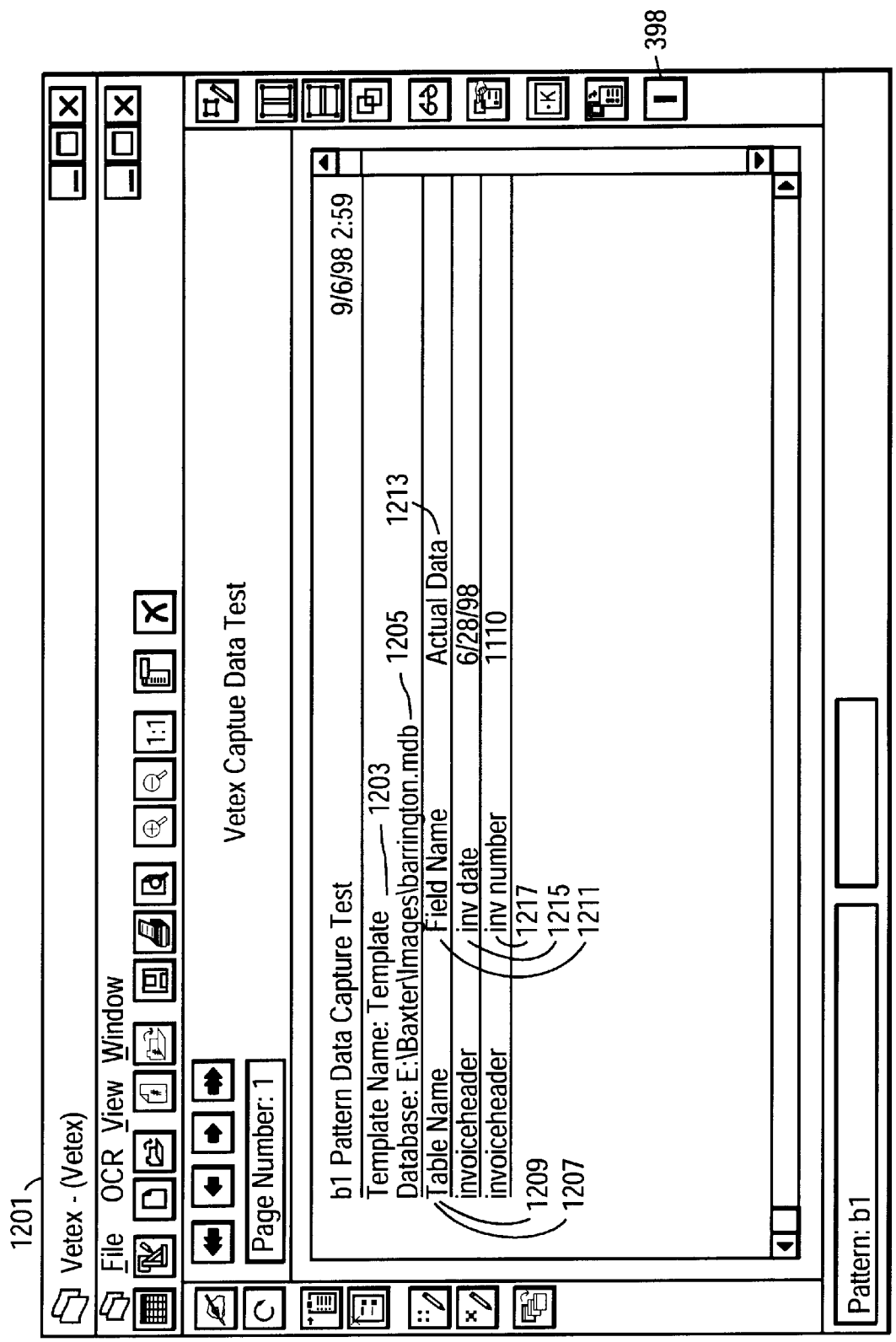
FIG. 12 is a screen illustration displaying data captured in a test of the master document image using the data pattern and data template defined in FIG. 11.

To see if this pattern performs properly with the image containing the information, the user selects TEST DATA CAPTURE icon 398. Shown in FIG. 12 is screen 1201 that displays the captured test data. Displayed in screen 1201 are the name of the data template used at 1203, the database name at 1203, and a table 1207 comprised of the following columns: Table Name 1209, Field Name 1211, and Actual Data 1213. As seen in screen 12, the two data fields, INV_DATE 1215 and INV_NUMBER 1217 are populated with the data "Jun. 28, 1998" and "1110," respectively, extracted from data using the pattern set out at the end of the previous paragraph. The system stores the data in the "Barrington.MDB" database and in the table labeled "InvoiceHeader."

For each zone on the template associated with a master document image, a data template pattern is created. In addition, alternate zones having a different data template pattern can be created for the identical region on a master document image. This allows for different data formats to be recognized within a given document image. Examples of alternate patterns can be seen by reference to FIGS. 13A and 13B. As shown in these figures, two different address zone patterns are used. In FIG. 13A, the first line 1301 of the pattern comprises the following characters:

<TAB><TAB><First Name one to twenty alpha characters in length><SPACE><Last Name one to twenty alpha characters in length><LF><CR>.

The second line of the pattern comprises:

<TAB><TAB><Street Number one to ten alphanumeric characters in length>

<SPACE><Street Name one to twenty alphanumeric characters in length><LF><CR>.

The third line of the pattern comprises:

<TAB><TAB><City one to twenty alpha characters in length><SPACE>

<State Code two alphanumeric characters in length><SPACE><Postal Code one to sixteen alphanumeric characters in length><LF><CR>.

Shown in FIG. 13B is a variation of the address pattern shown in FIG. 13A. Only the first line of the address zone pattern has changed. As shown in FIG. 13B, the first line 1301A of the pattern now consists of the following:

<TAB><TAB><First Name one to twenty alpha characters in length><SPACE>

<Middle Initial one to two alpha characters in length><SPACE><Last Name one to twenty alpha characters in length><LF><CR>.

Once the zones and patterns and template have been defined for the master document image, the process of extracting the data from scan images based on that master document image can be undertaken.

A master document image created using the master document image production system 200 and the above described process is shown in FIG. 5B, master document image 550. As shown in FIG. 5B, the following regions remain on the master document image: SHIP TO 501, SHIP TO ACCOUNT NO. region 502, SOLD TO 503, PAYMENT TERMS 505, INVOICE DATE 506, INVOICE NUMBER 507, QUANTITY 508, CATALOG NUMBER 509, PRODUCT DESCRIPTION 510, UNIT PRICE 513, AMOUNT 514, TOTAL 515, SOLD TO ACCOUNT NO. 518, and CUSTOMER PURCHASE ORDER NUMBER 519, each region defining a zone having at least one associated pattern for capturing data to be stored in the database. In addition, textural information regions 516, 517 have been removed from master document image 550. While all vertical and horizontal lines with the exception of the broad horizontal line across the top of master document image 550 have been deleted, it is not necessary to do so. Any various combinations of lines and other information can be left on or deleted depending the choice of the operator creating the master document image. As seen in FIG. 5B, all the variable data contained in the remaining regions has been removed. In addition, the variable data in the other regions has also been removed from the form to create master document image 550. Prior to the removal of the information contained in the different zones to be used in the master, the data was used to establish the patterns that are associated with each of the zones that are used with the template that is associated with this master document image.

Data Extraction Process

Figure 14A:
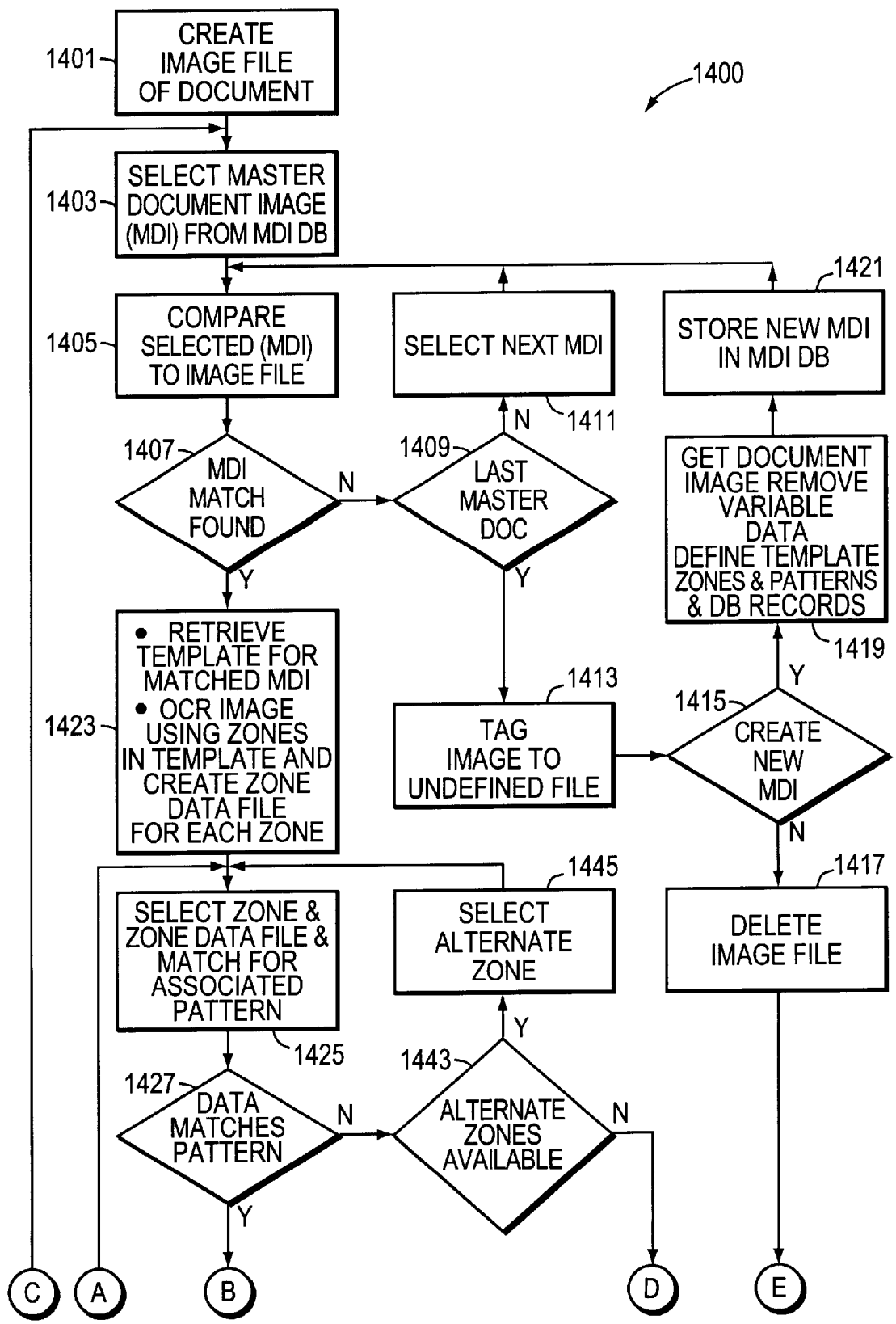
FIGS. 14A and 14B illustrate the process flow diagram used for the extraction of data from a digital image and also the creation of a master document image.
Figure 14B:
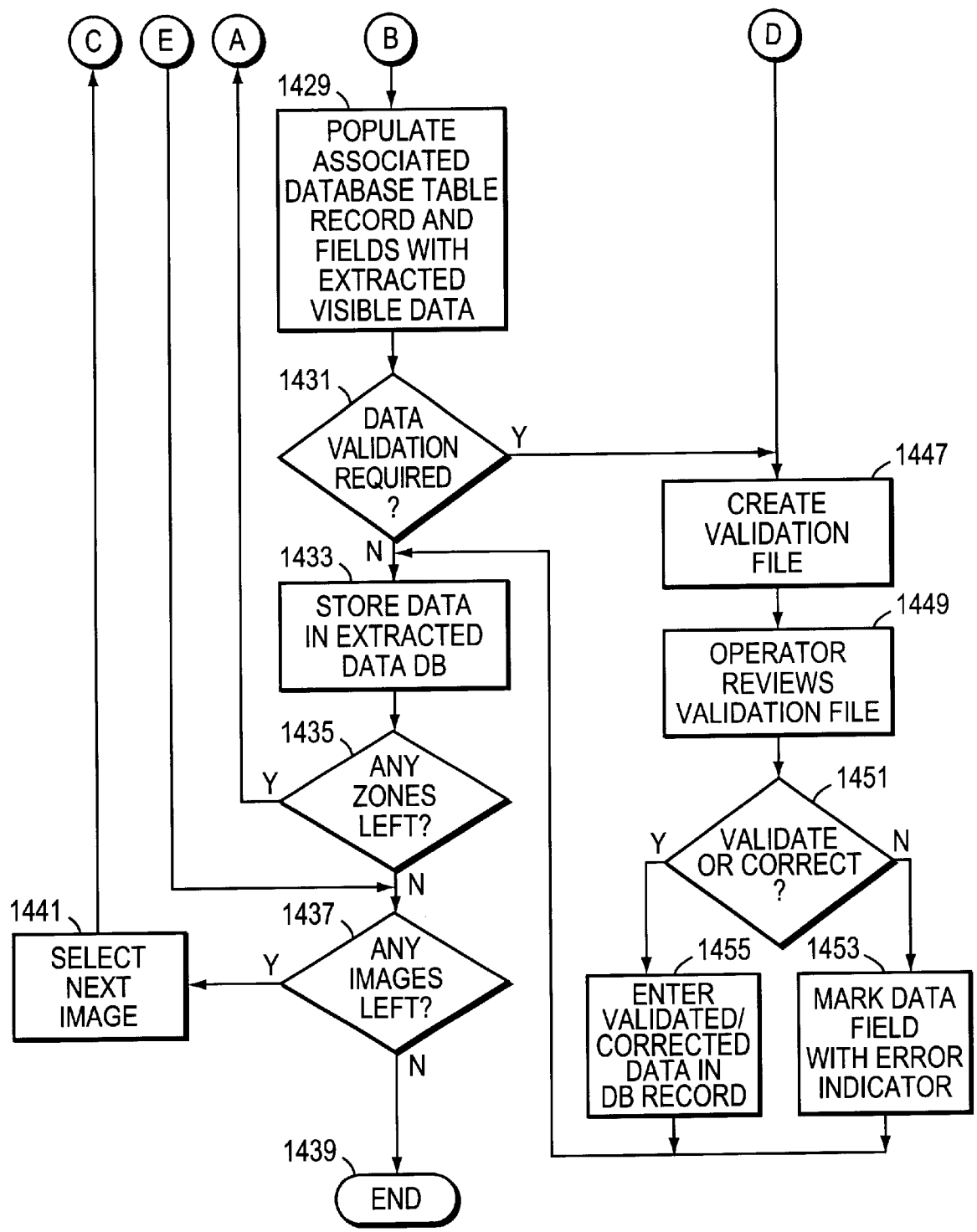

A flow diagram of the data extraction process 1400 is illustrated in FIGS. 14A and 14B. At step 1401 the process either creates or receives an image file of the document from which data is to be extracted is created. This image file can be created through the use of scanner or other means which will create the digital image of the document. The file format can be any graphical format such as a TIF format, JPEG format, a bit map image, a Windows metafile etc. At step 1403, the system selects a master document image from the master document image database. Alternatively, an operator can also select the master document or a bar code can be provided on the scanned image which can be used to automatically select the appropriate master document image. At step 1405, the system compares the selected master document image to the scanned image. At step 1407, it is determined whether or not a match has been found. Matches are determined using the stored registration data. If the horizontal and vertical line data of the scanned image match the saved vertical and horizontal registration data, a match has occurred. If no match has been found, the process proceeds to step 1409 where it is determined whether or not the last master document image available for use has been used in the process. If it has not, the process proceeds to step 1411 where the next master document in the master document image database is selected. The process then proceeds back to step 1405 for the comparison. Assuming at this point no match is found, the process then proceeds again to step 1409 and assuming for purposes of illustration that no further master document images remain to be compared, the process proceeds to step 1413. At step 1413 the system tags the document image as an undefined file. Thereafter, at step 1415, a decision is made whether or not to create a new master document image from the image tagged as being an undefined file. If the decision is not to create a new master document image, the process proceeds to step 1417 and the system deletes the tagged image file. If the decision is made to create a new master document image, the process proceeds to step 1419 at which point the system proceeds with the process previously described for the creation of a master document using the master document image production system. Briefly, the variable data is removed from the image and templates, zones and patterns and database records are defined for the document image. The process then proceeds to step 1421 where the system stores the new master document image in the master document image database. The process then proceeds to step 1405 where this new image is available for the selection and comparison performed at step 1405.

At step 1407, assuming that a match has been found between a master document image and the scanned document image, the process proceeds to step 1423 where the system retrieves templates for the matched master document image and OCRs the image using the retrieved templates to create an ASCII data file for each zone. Next, at step 1425 the system selects a zone, and, using on the pattern associated with that zone, the ASCII data file for that zone is searched. At step 1427 a determination is made of whether or not a pattern match has been found in the data file. If a pattern match has been found, the process proceeds to step 1429 where the system parses and extracts the data contained within the zone based on the associated pattern and the database record associated with the pattern will be populated with the extracted data. Next at step 1431 a decision is made whether or not data validation is required. If not, the process proceeds to step 1433 where the system stores extracted data that is to be captured in the database table of the designated database. Next at step 1435 a decision is made whether or not any zones are left to search. If no more zones are left to search, the process proceeds to step 1437 where a decision is made whether or not any additional images are left to be processed. If no images are remaining to be processed, the process proceeds to step 1439 where it ends.

At step 1435, if it is determined additional zones are left to search, the process proceeds back to step 1425 where the system selects the next zone to be search. The loop continues until no further zones are left to be searched. At step 1437, if additional images are remaining to be processed, the process proceeds to step 1441, where the next digital image to be processed is selected. The process then proceeds back to step 1403 where the new image that has been selected is then be processed.

Back at step 1427, where it was determined whether or not a match was found for the pattern in the zone, if it has been determined that no match was found, the process then proceeds to step 1443 where a decision is made whether or not alternate zones (patterns) are available. If alternate zones are available, the process proceeds to step 1445 where the system selects the next available alternate zone. The process proceeds back to step 1425 to undergo the search using the new alternate zone and its associated pattern. At step 1443, if no alternate zones are available, the process proceeds to step 1447 where a validation file is created with the data from the scanned document. Also, at step 1431 if the captured data required validation, the process also proceeds to step 1447 for the creation of a validation file. After a validation file has been created, the process proceeds to step 1449 where an operator reviews the validation file. Next, at step 1451, it is determined whether or not the data is to be validated or corrected. If the data is not correctable, the process proceeds to step 1453 where the operator marks the data field with an error indicator. The process then proceeds to step 1433 for continuation. At step 1451, if it is determined that that data is to be validated or is correctable, the process proceeds to step 1455 where the operator enters either the validated data or the corrected data into the database record. The process then proceeds again back to step 1433. Steps 1447–1455 can be performed during the data extraction process or can be performed at a later time.

Other embodiments of the invention will be apparent to those skilled in the art from a consideration of the specification or from practice of the invention disclosed herein. It is intended that the specification be considered as exemplary only with the scope and spirit of the present invention being indicated by the following claims.

I claim:

1. A system for the extraction of textual data from a digital image using predefined patterns based on visible and invisible characters contained in the textual data, comprising: database means for storing data base records comprising:
   a master document image database comprised of at least one table containing at least one master document image;

a template database comprised of at least one table comprising at least one template associated with the master document image, the template having at least one zone, the zone associated with a unique pattern comprised of one or more nonoverlapping segments, each segment containing one or more characters, with selected ones of the segments being associated with a data field in an extracted data base record;

an extracted data database comprised of at least one table of extracted data base records, each record comprised of at least one data field for storing textual information extracted from the digital image;

an image comparator in communication with the database means and receiving therefrom the master document image, the image comparator having an input for receiving the digital image, the image comparator comparing the master document image to the digital image and providing an output indicative of the success of the comparison;

a template mapper in communication with the database means and the output of the image comparator and having an input for receiving the digital image and, on receiving the image comparator output indicating a successful comparison, retrieving the template from the template database associated with the successfully compared master document image and applying the template to the digital image, the template mapper providing as an output an image of each zone associated with the applied template;

a zone optical character reader (OCR) in communication with the template mapper and receiving the output thereof, the zone OCR creating a zone data file of the characters in each zone image and providing the zone data file as an output;

a zone pattern comparator in communication with the database means and the output of the zone OCR, the zone pattern comparator retrieving from template database the pattern associated with the zone and comparing the pattern to the zone data file, and, in the event that the pattern is found, extracting the data matching the pattern digital into an extracted data file, the zone pattern comparator providing the extracted data file as an output; and an extracted data parser in communication with the database means and the output of the zone pattern comparator, the parser parsing the data in the extracted data file for populating the data field of the database record associated with the pattern, the parser providing as an output the populated database record to the extracted data database for storage therein.

2. The system of claim 1 further comprising a document scanner for creating a digital image of a document.

3. The system of claim 1 wherein the system further comprises a computer system being responsive to a program operating therein, said programmed computer system programmed to be the image comparator, the template mapper, the zone optical reader, the zone pattern comparator, the extracted data parser and the database means.

4. The system of claim 1 further comprises means for creating a master document image comprising:

an image enhancer having an input for receiving a digital image of a document to be made into a master document image, the image enhancer comprising:
selection means for selectably choosing from the following operations:
deskewing, registration, line management, fix white text, noise removal, character enhancement, image orientation, image enhancement, and image extraction image; and
means for performing each of the selected operations on the digital image to produce an enhanced digital image;

a zone mapper in communication with the image enhancer and receiving therefrom the enhanced image, the zone mapper comprising:
means for selecting one or more regions of said enhanced image and defining each selected region as a zone;
means for selecting a zone and selectably removing images and data contained in a selected zone; and
means for associating each zone defined for the enhanced image with a template;

OCR reader means for converting material in a selected zone into a data file of characters;

a pattern mapper in communication with the OCR reader means and receiving therefrom the data file for a selected zone, the pattern mapper comprising:
means for selecting from the data file a sequence of characters to be used to define a pattern;
means for creating a data template having one or more nonoverlapping data segments, each segment containing one or more characters contained in the pattern;
means for selectably associating with each data segment one or more of the following characteristics: capture data indicator, data type, data format, element length, table name, field name, field type, field length, and validation indicator; and
means for associating the pattern and its associated characteristics with the zone; and
means for storing the template and the associated zones, patterns and characteristics in a database.

5. The system of claim 4 further wherein the system further comprises a computer system being responsive to a program operating therein, said programmed computer system comprising the image comparator, the template mapper, the zone optical reader, the zone pattern comparator, the extracted data parser, the database means, and the means for creating a master document image.

6. A method for the extraction of textual data from a digital image containing character images using predefined patterns based on visible and invisible characters contained in the textual data, comprising:

a) selecting from a database a master document image having associated therewith a template, the template having a zone, the zone having associated therewith one pattern comprised of at least one data segment each containing a data sequence of one or more characters;

b) creating an unpopulated database table having one or more data records, each data record having one or more data fields for containing visible character data extracted from the digital image and associating the database table with the master document image and the database record with the digital image, and, for at least one of the data segments containing visible data associating it with a database field in the database;

c) comparing the digital image to the master document image and upon an successful match occurring:
applying the associated template and the zone therein to the digital image, performing optical character recognition on the character images within the zone, creating a zone data file containing the characters optically read from the zone; comparing the zone data file with the pattern associated with the zone;

extracting the data in the zone data file that matches the pattern, and, for each data segment associated with a data field, populating the data field with the visible data extracted from the zone data file corresponding to that data segment.

7. The method of claim 6 further comprising the step of creating, upon an unsuccessful match of the digital image with the master document image, a file for the unmatched digital image and alerting the operator that no match has been found.

8. The method of claim 7 further comprising:

processing the file containing the unmatched digital image to create a new master document and associated template, zones and patterns comprising the steps of:

selectably removing images and data not required to be extracted from the unmatched digital image to form a new master document image;

defining on the unmatched digital image one or more nonoverlapping zones of data to be extracted to form a template;

performing optical character recognition on the character images contained in each zone and converting the character images into a data file of characters;

selecting from the data file for each zone a sequence of characters to be used to define a pattern of data to be extracted;

creating a data template having one or more nonoverlapping data segments, each segment containing one or more characters contained in the pattern;

selectably associating with each data segment one or more of the following characteristics: capture data indicator, data type, data format, element length, table name, data field name, data field type, data field length, and validation indicator;

associating the pattern and its associated characteristics with its respective zone; and storing the template and the associated zones, patterns and characteristics in the database.

9. The method of claim 7 further comprising the step of creating, in the event no zone data matching the pattern is found, a validation file containing the zone data file for operator review.

10. The method of claim 6 further comprising the step of scanning a printed document containing data to be extracted and entered into the database record to create a digital image of the printed document for processing.

11. The method of claim 6 wherein the template further comprises one or more alternate zones, each alternate zone associated with a unique alternate pattern that is similar to but differs from the pattern associated with the other zones and the step of comparing the zone data file with the zone pattern further comprises:

selecting one of the alternate zones in the event no match is found with the pattern in the zone;

comparing the selected alternate zone and its associated pattern with the zone data file;

repeating the foregoing steps until a match is found with one of the alternate zones;

in the event no match is found, creating a validation file containing the zone data for which no much was found; and in the event of a match, performing the steps of extracting and populating using the data pattern found in the matching alternate zones.

12. A method for the extraction of textual data from a digital image using predefined patterns based on visible and invisible characters contained in the textual data, comprising:

a) creating at least one master document image having associated therewith at least one template, the template having at least one zone, each zone having associated with it one predefined pattern comprised of one or more data segments containing a data sequence of one or more characters;

b) creating an unpopulated database table having one or more data records, each data record having one or more data fields for containing visible character data extracted from the digital image and associating the database table with the master document image and the database record with the digital image, and, for at least one of the data segments containing visible data associating it with a database field;

c) storing the database record, master document image and associated template, zone and pattern in a database;

d) comparing the digital image to a master document image retrieved from the database;

e) upon an unsuccessful match:
1) selecting a new master document image from the database for comparison until a match is found; and
2) in the event no match is found, creating a file for the unmatched image and alerting the operator that no match has been found;

f) upon an successful match:
1) applying the associated template and each zone therein to the digital image,
2) performing optical character recognition on the characters images within each zone,
3) creating, for each zone, a zone data file containing the characters read from the zone;
4) selecting a zone data file;
5) comparing the selected zone data file with the pattern associated with the selected zone;
6) in the event no data matching the pattern is found, creating a validation file containing the zone data file for operator review; and
7) in the event data matching the pattern is found, extracting the data in the zone data file that matches the pattern, and, for each data segment associated with a data field, populating the data field with the visible data extracted from the zone data file corresponding to that data segment.

g) selecting, if additional zones are present, the next zone and repeating steps d–f; and h) selecting, if additional digital images are present, the next digital image to be processed and repeating steps d–g.

13. The method of claim 12 further comprising the steps of:

determining if the data in the populated data field requires validation, and on determining that validation is required, creating a second validation file containing at least the data field for operator review.

* * * * *

UNITED STATES PATENT AND TRADEMARK OFFICE
CERTIFICATE OF CORRECTION

PATENT NO. : 6,400,845 B1  Page 1 of 1
DATED : June 4, 2002
INVENTOR(S) : Volino, Gary It is certified that error appears in the above-identified patent and that said Letters Patent is hereby corrected as shown below:

<u>Column 2,</u>
Line 33, change "image mapper" to -- image comparator --.

Signed and Sealed this

Eighteenth Day of February, 2003

JAMES E. ROGAN
*Director of the United States Patent and Trademark Office*